(12) United States Patent
Lee et al.

(10) Patent No.: US 11,136,103 B2
(45) Date of Patent: Oct. 5, 2021

(54) SHIP HAVING GAS REGASIFICATION SYSTEM

(71) Applicant: HYUNDAI HEAVY INDUSTRIES CO., LTD., Ulsan (KR)

(72) Inventors: Kwang Jin Lee, Ulsan (KR); Sang Min Park, Ulsan (KR)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 288 days.

(21) Appl. No.: 16/083,461

(22) PCT Filed: Mar. 17, 2017

(86) PCT No.: PCT/KR2017/002947
§ 371 (c)(1),
(2) Date: Sep. 7, 2018

(87) PCT Pub. No.: WO2017/160125
PCT Pub. Date: Sep. 21, 2017

(65) Prior Publication Data
US 2019/0063684 A1   Feb. 28, 2019

(30) Foreign Application Priority Data

Mar. 18, 2016  (KR) .................. 10-2016-0032911
Jul. 20, 2016   (KR) .................. 10-2016-0092308
Sep. 8, 2016   (KR) .................. 10-2016-0115564

(51) Int. Cl.
*F17C 9/02*         (2006.01)
*B63H 21/38*    (2006.01)
(Continued)

(52) U.S. Cl.
CPC .............. *B63H 21/38* (2013.01); *B63J 99/00* (2013.01); *F02M 21/0215* (2013.01);
(Continued)

(58) Field of Classification Search
CPC ...... F17C 9/00; F17C 9/02; F17C 2227/0318; F17C 2227/03; F17C 2227/0393
See application file for complete search history.

(56) References Cited

U.S. PATENT DOCUMENTS 6,598,408 B1    7/2003 Nierenberg
2003/0159800 A1*  8/2003 Nierenberg ............... F17C 5/06
                                                         165/41
(Continued)

FOREIGN PATENT DOCUMENTS

CN           1623063       6/2005
CN           1898127       1/2007
(Continued)

OTHER PUBLICATIONS

International Search Report for PCT/KR2017/002947 dated Jun. 28, 2017 and its English translation from WIPO.
(Continued)

*Primary Examiner* — Brian M King
(74) *Attorney, Agent, or Firm* — Ladas & Parry, LLP

(57) ABSTRACT

According to the present invention, a ship including a gas re-vaporizing system including a re-vaporizing apparatus, which re-vaporizes liquefied gas through seawater supplied by a seawater supply apparatus, supplies a fluid inside a seawater storage tank, which maintains pressure of seawater flowing in a circulation connection line, to the circulation connection line, in order to implement the switch of an operation mode of the seawater supply apparatus from an open loop mode to a close loop mode non-stop.

20 Claims, 12 Drawing Sheets

(51) Int. Cl.
*F02M 21/02* (2006.01)
*F02M 21/06* (2006.01)
*F17C 9/00* (2006.01)
*F17C 7/04* (2006.01)
*F02M 31/18* (2006.01)
*B63J 99/00* (2009.01)
*B63B 25/16* (2006.01)

(52) U.S. Cl.
CPC ........ *F02M 21/0287* (2013.01); *F02M 21/06* (2013.01); *F02M 31/18* (2013.01); *F17C 7/04* (2013.01); *F17C 9/00* (2013.01); *F17C 9/02* (2013.01); *B63B 25/16* (2013.01); *F02M 21/0212* (2013.01); *F17C 2201/052* (2013.01); *F17C 2205/0326* (2013.01); *F17C 2221/033* (2013.01); *F17C 2223/0161* (2013.01); *F17C 2225/0123* (2013.01); *F17C 2225/033* (2013.01); *F17C 2227/0142* (2013.01); *F17C 2227/0178* (2013.01); *F17C 2227/0309* (2013.01); *F17C 2227/0318* (2013.01); *F17C 2227/0323* (2013.01); *F17C 2227/0393* (2013.01); *F17C 2250/01* (2013.01); *F17C 2250/034* (2013.01); *F17C 2265/05* (2013.01); *F17C 2270/011* (2013.01); *F17C 2270/0105* (2013.01); *Y02T 10/30* (2013.01)

(56) References Cited

U.S. PATENT DOCUMENTS

| | | | |
|---|---|---|---|
| 2008/0120983 A1* | 5/2008 | Eyermann | F17C 9/02 62/50.2 |
| 2010/0192597 A1 | 8/2010 | Nierenberg | |
| 2011/0132003 A1* | 6/2011 | Pozivil | F17C 7/04 62/45.1 |
| 2019/0063684 A1 | 2/2019 | Lee et al. | |

FOREIGN PATENT DOCUMENTS

| | | |
|---|---|---|
| CN | 102926894 | 2/2013 |
| JP | 6-27492 U | 4/1994 |
| JP | 2007-14377 | 1/2007 |
| JP | 2012-17030 | 1/2012 |
| JP | 2014-15143 | 1/2014 |
| KR | 10-2008-0085284 | 9/2008 |
| KR | 10-2009-0113118 | 10/2009 |
| KR | 10-0981146 | 9/2010 |
| KR | 10-2012-0004229 | 1/2012 |
| KR | 10-2013-0011152 | 1/2013 |
| KR | 10-1342733 | 12/2013 |
| KR | 10-2014-0044139 | 4/2014 |
| KR | 10-2014-0084832 | 7/2014 |
| KR | 10-2015-0000161 | 1/2015 |
| KR | 10-2015-0019520 | 2/2015 |
| KR | 10-2015-0130711 | 11/2015 |
| TW | 568865 | 1/2004 |
| WO | 2007/039480 | 4/2007 |
| WO | 2013/118756 | 8/2013 |

OTHER PUBLICATIONS

Written Opinion of the International Searching Authority for PCT/KR2017/002947 dated Jun. 28, 2017 and its English machine translation by Google Translate.
Office Action dated Jun. 16, 2020 for Korean Patent Application No. 10-2016-0092304 and its English machine translation by Google Translate.
Office Action dated Jun. 16, 2020 for Korean Patent Application No. 10-2016-0092307 and its English machine translation by Google Translate.
Office Action dated Jun. 19, 2020 for Korean Patent Application No. 10-2016-0092314 and its English machine translation by Google Translate.
Office Action dated Jul. 3, 2020 for Chinese Patent Application No. 201780014821.2 and its English translation provided by Applicant's foreign counsel.
Extended European Search Report dated Oct. 28, 2019 for European Patent Application No. 17767026.2.
Office Action dated Oct. 8, 2019 for Chinese Patent Application No. 201780014821.2 and its English translation provided by Applicant's foreign counsel.
International Preliminary Report on Patentability (Chapter I) for PCT/KR2017/002947 dated Sep. 18, 2018 and its English translation from WIPO.
Office Action dated Sep. 3, 2019 for Japanese Patent Application No. 2018-548450 and its English translation from Global Dossier.
Office Action dated Jun. 21, 2021 for Chinese Patent Application No. 201780014821.2 and its English translation by Google Translate.
Office Action dated Jul. 26, 2021 for Chinese Patent Application No. 202010091081.6 and its English translation by Google Translate.

* cited by examiner

SHIP HAVING GAS REGASIFICATION SYSTEM

CROSS-REFERENCE TO RELATED APPLICATIONS

This application is the U.S. National Stage of International Patent Application No. PCT/KR2017/002947 filed on Mar. 17, 2017, which claims the priority to Korean Patent Application No. 10-2016-0032911 filed in the Korean Intellectual Property Office on Mar. 18, 2016, Korean Patent Application No. 10-2016-0092308 filed in the Korean Intellectual Property Office on Jul. 20, 2016, and Korean Patent Application No. 10-2016-0115564 filed in the Korean Intellectual Property Office on Sep. 8, 2016, the entire contents of which are incorporated herein by reference.

TECHNICAL FIELD

The present invention relates to a ship including a gas re-vaporizing system.

BACKGROUND ART

In general, it is known that Liquefied Natural Gas (LNG) is clean fuel and reserves of LNG are larger than oil reserves, and the amount of LNG used is sharply increased according to the development of oil drilling and transport technologies. It is general that LNG is stored in a liquid state by decreasing a temperature of methane that is a main component to a temperature of −162° C. or lower at 1 atmosphere, and a volume of liquefied methane is about 1/600 of a volume of methane in a gas state that is a standard state, and specific gravity of liquefied methane is about 0.42, which is ½ of specific gravity of crude oil.

LNG is liquefied and transported, and then is vaporized and used at a used place by easiness of the transportation. However, due to natural disasters and a terror risk, there is a concern that LNG vaporizing equipment is installed on land.

Accordingly, instead of a liquefied natural gas re-vaporizing system installed on land in the related art, equipment, in which a re-vaporizing apparatus is installed in an LNG carrying vessel carrying LNG and vaporized natural gas is supplied to land, is in the limelight.

In an LNG re-vaporizing apparatus system, LNG stored in a liquefied gas storage tank is pressurized by a boosting pump and is sent to an LNG vaporizer, and the LNG is vaporized to NG in the LNG vaporizer and is sent to a demander on land. Here, large energy is required in a process of heat exchange, in which a temperature of LNG is increased in the LNG vaporizer. Accordingly, in order to solve the problem in that energy used in the process is inefficiently exchanged and is wasted, research on various heat exchange technologies for efficient re-vaporization has been conducted.

DISCLOSURE

Technical Problem

The present invention is conceived to improve the related art, and an object of the present invention is to provide a ship including a gas re-vaporizing system, which is capable of maximizing efficiency of re-vaporization of liquefied gas.

Technical Solution

An exemplary embodiment of the present invention provides a ship including a gas re-vaporizing system including a re-vaporizing apparatus, which re-vaporizes liquefied gas through seawater supplied by a seawater supply apparatus, in which the seawater supply apparatus includes: a seawater supply line which supplies the seawater to the re-vaporizing apparatus; a seawater discharge line which discharges the seawater from the re-vaporizing apparatus; a circulation connection line which is branched from the seawater discharge line and connects the seawater supply line; a seawater storage tank which is provided on the circulation connection line, and maintains pressure of the seawater flowing in the circulation connection line; and a tank connection line which connects the seawater storage tank and the circulation connection line, and the tank connection line supplies a fluid inside the seawater storage tank on the circulation connection line before the seawater flowing in the seawater discharge line is switched to flow the circulation connection line without being discharged to the outside.

Particularly, the ship may further include: a first opening/closing valve which is disposed closer to a point of the circulation connection line connected with the seawater supply line; and a second opening/closing valve which is disposed closer to a point of the circulation connection line branched from the seawater discharge line.

Particularly, the ship may further include a seawater pump which is provided on the seawater supply line and supplies the seawater to the re-vaporizing apparatus, and the seawater pump may be located below a sea surface.

Particularly, the ship may further include: a third opening/closing valve which is provided in an upstream of the seawater pump on the seawater supply line; a fourth opening/closing valve which is provided in a downstream of a branch point of the circulation connection line in the seawater discharge line; a pressure maintaining fluid supply valve which is provided on the tank connection line; and a control unit which adjusts opening of the first to fourth opening/closing valves and the pressure maintaining fluid supply valve, and implements a switch so that the seawater flowing in the seawater discharge line flows the circulation connection line without being discharged to the outside non-stop.

Particularly, the control unit may open the pressure maintaining fluid supply valve and control the fluid to be supplied to the circulation connection line before the operation type is switched so that the seawater flowing in the seawater discharge line flows the circulation connection line without being discharged to the outside.

Particularly, when the circulation connection line is fully filled with the fluid, the control unit may control the third and fourth opening/closing valves to be closed and the first and second opening/closing valves to be opened.

Particularly, the seawater storage tank may maintain pressure of the seawater by using atmospheric pressure.

Particularly, the fluid inside the seawater storage tank may be seawater.

Particularly, the ship may further include a fire suppression firefighting water storage tank which stores firefighting water for suppressing fire, and the seawater storage tank may be connected with the fire suppression firefighting water storage tank.

Particularly, the fire suppression firefighting water storage tank may supply the firefighting water stored therein to the seawater storage tank before the seawater flowing in the seawater discharge line is switched to flow the circulation connection line without being discharged to the outside.

Particularly, the re-vaporizing apparatus may include a vaporizer which directly vaporizes the liquefied gas by using the seawater.

Particularly, the re-vaporizing apparatus may include: a vaporizer which vaporizes the liquefied gas by using an intermediate heat medium; and a heat source heat exchanger which supplies a heat source of the seawater to the intermediate heat medium.

Particularly, the first opening/closing valve may be a non-stop switch valve, the second opening/closing valve may be a circulation valve, the third opening/closing valve may be a seawater supply valve, and the fourth opening/closing valve may be a seawater discharge value, the control unit may be a third control unit, the seawater storage tank may be a pressure maintaining device, and the tank connection line may be a pressure maintaining device connection line.

Another exemplary embodiment of the present invention provides a gas re-vaporizing system including a re-vaporizing apparatus, which re-vaporizes liquefied gas through seawater supplied by a seawater supply apparatus, in which the seawater supply apparatus includes a seawater discharge line which discharges the seawater from the re-vaporizing apparatus, and at least a part of the seawater discharge line may be formed at a position higher than the re-vaporizing apparatus.

Particularly, the seawater discharge line may include: a negative pressure preventing line which is formed at a position higher than the re-vaporizing apparatus; a seawater discharge upstream line which connects the re-vaporizing apparatus and the negative pressure preventing line; and a seawater discharge downstream line which is connected with the negative pressure preventing line and a seawater outlet, through which the seawater is discharged to the outside.

Particularly, at least a part of the seawater discharge upstream line may be horizontal to the re-vaporizing apparatus.

Particularly, the negative pressure preventing line may be connected with the seawater discharge upstream line in the form of a streamline.

Particularly, the seawater discharge downstream line may vertically connect the negative pressure preventing line and the seawater outlet.

Particularly, the seawater supply apparatus may further include: a vacuum removal line which removes a negative pressure within the seawater discharge line; and a vacuum removal valve which is provided on the vacuum removal line and adjusts a flow amount of air flowing into the seawater discharge line, and the vacuum removal line is connected to the seawater discharge downstream line in parallel.

Particularly, the negative pressure preventing line may include: an inlet which is connected with the seawater discharge upstream line; an outlet which is connected with the seawater discharge downstream line; and a connection part which connects the inlet and the outlet, and the outlet is connected with the vacuum removal line in parallel.

Particularly, the connection part may be connected with the inlet in the form of a streamline.

Particularly, the connection part may be connected with the inlet and the outlet at a right angle.

Particularly, the re-vaporizing apparatus may be located 28 to 32 m above a sea surface, and the seawater outlet may be located between the sea surface and −2 m below the sea surface.

Particularly, the seawater supply apparatus may further include: a negative pressure preventing valve which is provided on the seawater discharge line and controls a flow amount of the seawater discharged from the re-vaporizing apparatus; a vacuum removal line which removes a negative pressure within the seawater discharge line; and a vacuum removal valve which is provided on the vacuum removal line and adjusts a flow amount of air flowing into the seawater discharge line, and the vacuum removal line may be connected to a downstream of a position, at which the negative pressure preventing valve is provided, in the seawater discharge line based on a flow of the seawater.

Particularly, the seawater supply apparatus may further include a seawater discharge valve which is provided between the negative pressure preventing valve and a seawater outlet, through which the seawater is discharged to the outside on the seawater discharge line, and controls the discharge of the seawater to the outside.

Particularly, the re-vaporizing apparatus may include: a vaporizer which vaporizes the liquefied gas by using an intermediate heat medium; and a heat source heat exchanger which supplies a heat source of the seawater to the intermediate heat medium, and at least a part of the seawater discharge line may be formed at a position higher than the heat source heat exchanger.

Advantageous Effects

In the ship including the gas re-vaporizing system according to the present invention, it is possible to stably remove a packing fluid remaining in the circulation connection line when an operation type of the seawater supply apparatus is switched from the open loop operation type to the close loop operation type, so that the switch of the operation type may be performed non-stop, thereby achieving an effect in that the re-vaporized liquefied gas is smoothly supplied to a demander.

BEST MODE

Figure 1:
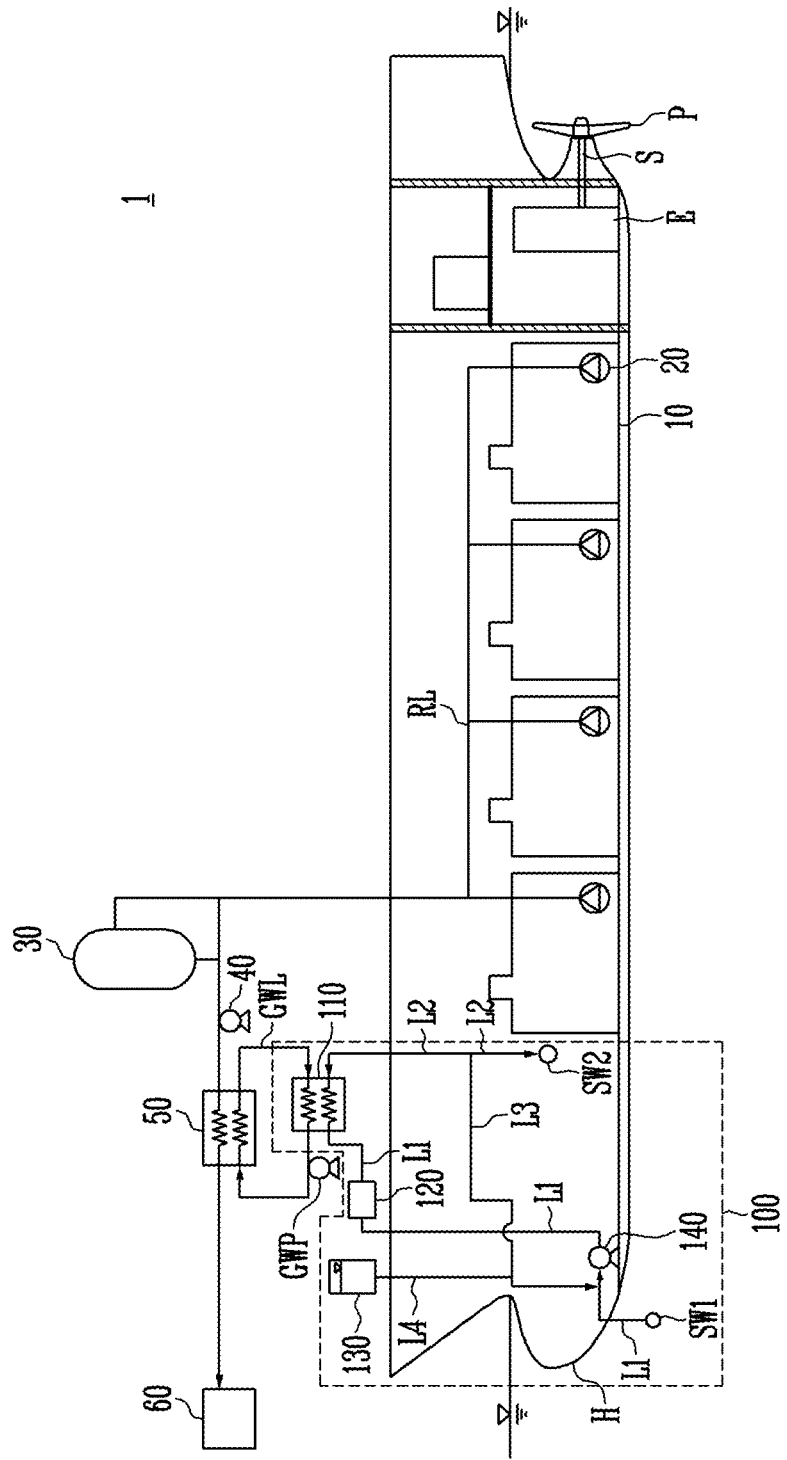
FIG. 1 is a conceptual diagram of a ship including a gas re-vaporizing system according to an exemplary embodiment of the present invention.

An object, specific advantages, and novel characteristics of the present invention will be more apparent from the detailed description and exemplary embodiments below in connection with the accompanying drawings. It should be noted that in giving reference numerals to elements of each drawing in the present specification, like reference numerals refer to like elements even though like elements are shown in different drawings. Further, in the following description of the exemplary embodiment, a detailed description of known technology incorporated herein will be omitted when it is judged that the detailed description may make the subject matter of the present disclosure unclear.

Hereinafter, in the present specification, liquefied gas may be used as a meaning collectively including all of the gas fuels generally stored in a liquid state, such as Liquefied Natural Gas (LNG) or Liquefied Petroleum Gas (LPG), ethylene, and ammonia, and gas, which is not in a liquefied state by heating or pressurizing, may be expressed by liquefied gas for convenience. The same may also be applied to evaporation gas. Further, the LNG may be used as a meaning collectively including Natural Gas (NG) in a supercritical state, as well as a liquid state, and evaporation may be used as a meaning including liquefied evaporation gas, as well as evaporation gas in a gas state.

Hereinafter, an exemplary embodiment of the present invention will be described in detail with reference to the accompanying drawings.

FIG. 1 is a conceptual diagram of a ship including a gas re-vaporizing system according to an exemplary embodiment of the present invention.

As illustrated in FIG. 1, a gas re-vaporizing system 1 according to an exemplary embodiment of the present invention includes a liquefied gas storage tank 10, a feeding pump 20, a buffer tank 30, a boosting pump 40, a vaporizer 50, a demander 60, and a seawater supply apparatus 100.

Herein, the ship (of which a reference numeral is not indicated), in which the gas re-vaporizing system 1 is installed, includes a ship body H formed of a stem (of which a reference numeral is not indicated), a stern (of which a reference numeral is not indicated), and an upper deck (of which a reference numeral is not indicated), and is operated and propelled by transferring, by a propeller shaft S, power generated in an engine E of an engine room (of which a reference numeral is not indicated) disposed in the stern to a propeller P.

Further, in order to re-vaporize liquefied gas on the sea and supply the liquefied gas to a land terminal, the ship may be an LNG Re-vaporization Vessel (LNG RV) or a Floating Storage and Re-vaporization Unit (FSRU), in which the gas re-vaporization system 1 is installed in a liquefied gas carrying vessel (of which a reference numeral is not indicated).

Hereinafter, the gas re-vaporizing system 1 according to the exemplary embodiment of the present invention will be described with reference to FIG. 1.

The gas re-vaporizing system 1 according to the exemplary embodiment of the present invention uses a scheme of extracting liquefied gas in a liquid state from the liquefied gas storage tank 10, pressurizing the extracted liquefied gas with the boosting pump 40 via the buffer tank 30, heating and re-vaporizing the liquefied gas through a heat source by the vaporizer 50, and supplying the re-vaporized liquefied gas to the demander 60. That is, in brief, the gas re-vaporizing system 1 of the present invention re-vaporizes liquefied gas by using the vaporizer 50 and supplies the re-vaporized liquefied gas to the demander 60.

The vaporizer 50 may directly receive seawater from the sea water supply apparatus 100 and re-vaporize liquefied gas (direct re-vaporization scheme), and may indirectly receive seawater from the sea water supply apparatus 100 re-vaporize liquefied gas (direct re-vaporization scheme, a scheme in which glycol water that is an intermediate heat medium receives a heat source of seawater from a heat source heat exchanger 110 and the intermediate heat medium supplies the heat source received from the seawater to the vaporizer 50).

All of the exemplary embodiments of the present invention will be described based on the indirect re-vaporization scheme, but this is for convenience of the description, and the present invention is not particularly limited thereto, a re-vaporizing apparatus may refer to only the vaporizer 50 in the direct re-vaporization scheme, and may refer to both the vaporizer 50 and the heat source heat exchanger 110 in the indirect re-vaporization scheme, and may mean the heat source heat exchanger 110 for convenience.

The gas re-vaporizing system 1 according to the exemplary embodiment of the present invention may further include a liquefied gas supply line RL, and valves (not illustrated), of which opening is adjustable, may be installed on the liquefied gas supply line RL, and the amount of liquefied gas supplied or vaporized liquefied gas supplied may be controlled according to the adjustment of the opening level of each valve.

The liquefied gas supply line RL connects the liquefied gas storage tank 10 and the demander 60, and is provided with the feeding pump 20, the buffer tank 30, the boosting pump 40, and the vaporizer 50 to re-vaporize the liquefied gas stored in the liquefied gas storage tank 10 and then supply the liquefied gas to the demander 60.

Hereinafter, the individual configurations implementing the gas re-vaporizing system 1 according to the exemplary embodiment of the present invention will be described in detail.

The liquefied gas storage tank 10 stores liquefied gas to be supplied to the demander 60. The liquefied gas storage tank 10 needs to store liquefied gas in a liquid state, and in this case, the liquefied gas storage tank 10 may have a form of a pressure tank.

Hereinafter, the liquefied gas storage tank 10 may be disposed inside the ship body H, and for example, four liquefied gas storage tanks 10 may be formed in a front portion of the engine room. Further, the liquefied gas storage tank 10 may be, for example, a membrane-type tank, but is not limited thereto, and the liquefied gas storage tank 10 may have various forms, such as an independent tank, and the kind of liquefied gas storage tank 10 is not particularly limited.

The feeding pump 20 is provided on the liquefied gas supply line RL and is installed inside or outside the liquefied gas storage tank 10, thereby supplying the liquefied gas stored in the liquefied gas storage tank 10 to the buffer tank 30.

Particularly, the feeding pump 20 may be provided between the liquefied gas storage tank 10 and the buffer tank 30 on the liquefied gas supply line RL to first pressurize the liquefied gas stored in the liquefied gas storage tank 10 and supply the pressurized liquefied gas to the buffer tank 30.

The feeding pump 20 may pressurize the liquefied gas stored in the liquefied gas storage tank 10 at 6 to 8 bars and supply the pressurized liquefied gas to the buffer tank 30. Herein, the feeding pump 20 may pressurize the liquefied gas discharged from the liquefied gas storage tank 10, so that a pressure and a temperature of the pressurized liquefied gas may be slightly increased, and the pressurized liquefied gas may be still in a liquid state.

In this case, when the feeding pump 20 is provided inside the liquefied gas storage tank 10, the feeding pump 20 may be a submersible pump, and when the feeding pump 20 is installed outside the liquefied gas storage tank 10, the feeding pump 20 may be provided at a position inside the ship body H lower than a level of the liquefied gas stored in the liquefied gas storage tank 10 and may be a centrifugal pump.

The buffer tank 30 may be provided on the liquefied gas supply line RL to receive the liquefied gas from the liquefied gas storage tank 10 and temporarily store the received liquefied gas.

Particularly, the buffer tank 30 may receive the liquefied gas stored in the liquefied gas storage tank 10 from the feeding pump 20 through the liquefied gas supply line RL, and separate the liquefied gas into a liquid phase and a gas phase by temporarily storing the received liquefied gas, and the separated liquefied phase may be supplied to the boosting pump 40.

That is, the buffer tank 30 temporarily stores the liquefied gas and separates the liquefied gas into a liquid phase and a gas phase and then supplies the complete liquid phase to the boosting pump 40 to cause the boosting pump 40 to satisfy a Net Positive Suction Head (NPSH), thereby preventing cavitation of the boosting pump 40.

The boosting pump 40 may be provided between the buffer tank 30 and the vaporizer 50 on the liquefied gas supply line RL, and may pressurize the liquefied gas received from the feeding pump 20 or the liquefied gas received from the buffer tank 30 at 50 to 120 bars and supply the pressurized liquefied gas to the vaporizer 50.

The boosting pump 40 may pressurize the liquefied gas in accordance with a pressure demanded by the demander 60, and may be formed of a centrifugal pump.

The vaporizer 50 may be provided on the liquefied gas supply line RL to re-vaporize the high-pressure liquefied gas discharged from the boosting pump 40.

Particularly, the vaporizer 50 may be provided on the liquefied gas supply line RL between the demander 60 and the boosting pump 40 to vaporize the high-pressure liquefied gas supplied from the boosting pump 40 and supply the vaporized liquefied gas in a state desired by the demander 60.

The vaporizer 50 receives an intermediate heat medium through a heat source circulation line GWL, heat exchanges the intermediate heat medium and the liquefied gas, and vaporizes the liquefied gas, and circulates the intermediate heat medium, which is heat exchanged with the liquefied gas, again through the heat source circulation line GWL.

The vaporizer 50 may be provided with the heat source heat exchanger 110 on the heat source circulation line GWL in order to continuously supply a heat source to a first heat medium, and may be additionally provided with a heat source pump GWP and circulate the first heat medium in the heat source circulation line GWL.

In this case, the vaporizer 50 may use a nonexplosive heat medium, such as glycol water, sea water, steam, or engine exhaust gas, as the first heat medium for vaporizing liquefied gas having an extremely low temperature, and may supply the high-pressure vaporized liquefied gas to the demander 60 without a change in pressure.

Herein, a heat source supply device 110 receives a heat source through seawater and transfers the heat source to the vaporizer 50, and an apparatus transferring seawater to the heat source supply device 110 is referred to as the seawater supply apparatus 100.

The seawater supply apparatus 100 supplies seawater, which is a heat source for re-vaporizing liquefied gas by a re-vaporizing apparatus (the heat source heat exchanger 110), to the re-vaporizing apparatus, and may have an open loop operation type and a close loop operation type as an operation type.

Herein, the open loop operation type refers to the case where seawater is supplied and discharged in only one direction from a seawater supply line L1 to a seawater discharge line L2, and the close loop operation type refers to the case where seawater passes through the seawater supply line L1, the seawater discharge line L2, and a circulation connection line L3 and circulates the seawater supply line L1, the seawater discharge line L2, and the circulation connection line L3 again.

In the exemplary embodiment of the present invention, an operation type of the sea water supply apparatus 100 may be bi-directionally switched from the open loop operation type to the close loop operation type. The switch of the operation type of the sea water supply apparatus 100 results from a change in a temperature of seawater.

A temperature of seawater is high in summer, so that it is possible to use seawater as a heat source for re-vaporizing liquefied gas as it is. However, a temperature of seawater is low in winter, so that it is impossible to use seawater as a heat source for re-vaporizing liquefied gas as it is, and thus, it is necessary to heat seawater and use the heated seawater as a heat source for re-vaporizing liquefied gas.

In this respect, in order to decrease the supply of a heating source and efficiently use energy, the sea water supply apparatus 100 is driven in an opened state, that is, the open loop operation type, in summer, and the state of the sea water supply apparatus 100 is switched to a close state, that is, the close loop operation type, and is driven in winter.

In a seawater supply apparatus 200a (FIG. 8) in the related art, when the operation type of the seawater supply apparatus 200a is switched from the open loop operation type to the close loop operation type, it is necessary to remove an inside packing fluid (air) in the circulation connection line L3, which is not used in the open loop operation type, so that there is a problem in that it is necessary to stop the operation of the seawater supply apparatus for two or three days.

The reason is that when the inside packing fluid in the circulation connection line L3 is used as it is without being removed, air flows into the seawater pump 140 and cavitation is generated in the seawater pump 140, so that there is a concern that an operation of the seawater pump 140 is impossible.

In this respect, in the exemplary embodiment of the present invention, in order to solve the problem, the operation type of the sea water supply apparatus 100 may be bi-directionally switched from the open loop operation type to the close loop operation type non-stop.

Hereinafter, seawater supply apparatuses 100a to 100f will be described in detail with reference to FIGS. 2 to 7.

Non-described reference numerals 120, 130, 140, L4, SW1, and SW2 in FIG. 1 refer to a heater 120, a pressure maintaining device 130, the seawater pump 140, a pressure maintaining device connection line L4, a seawater inlet SW1, and a seawater outlet SW2, respectively, which will be described in detail with the seawater supply apparatuses are described with reference to FIGS. 2 to 7.

Figure 2:
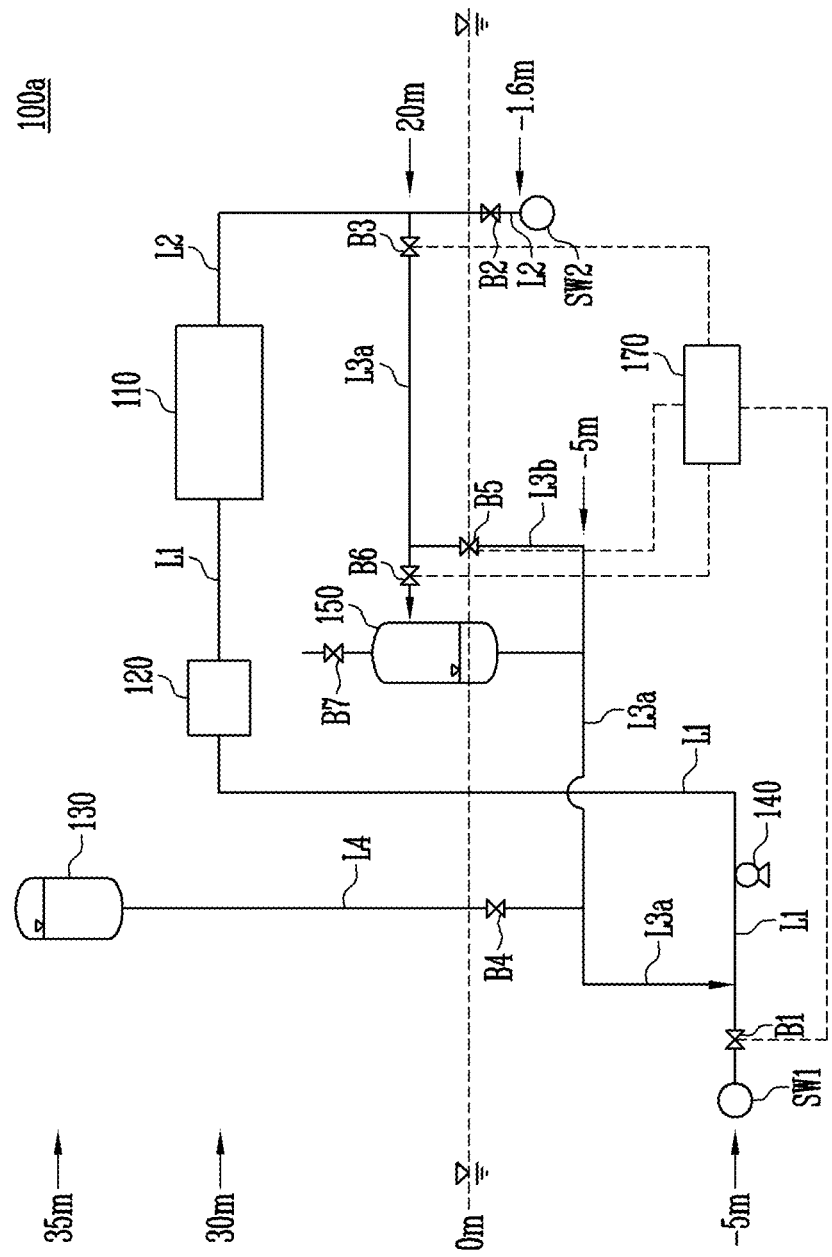
FIG. 2 is a conceptual diagram of a seawater supply apparatus according to a first exemplary embodiment of the present invention.

FIG. 2 is a conceptual diagram of a seawater supply apparatus according to a first exemplary embodiment of the present invention.

As illustrated in FIG. 2, a seawater supply apparatus 100a includes a heat source heat exchanger 110, a heater 120, a pressure maintaining device 130, a seawater pump 140, an intermediate tank 150, and a first control unit 170.

Before describing an individual configuration of the sea water supply apparatus 100a of the exemplary embodiment of the present invention, basic flow paths organically connecting the individual configurations will be described. Herein, a flow path is a passage, through which a fluid flows, and may mean a line, but is not limited thereto, and any configuration, in which a fluid flows, is acceptable.

In the exemplary embodiment of the present invention, the sea water supply apparatus 100a may further include a seawater supply line L1, a seawater discharge line L2, a circulation connection line L3, and a pressure maintaining device connection line L4. A valve (not illustrated), of which an opening level is adjustable, may be installed in each line, and the amount of seawater or fluid supplied may be controlled according to the adjustment of the opening level of each valve.

The seawater supply line L1 may connect a seawater inlet SW1 and the heat source heat exchanger 110, and may supply seawater supplied from the seawater inlet SW1 to the heat source heat exchanger 110 through the seawater pump 140.

The seawater supply line L1 may be provided with the seawater pump 140, a seawater supply valve B1, and the heater 120, and at least a part of the seawater supply line L1 may be disposed under a sea surface. Herein, the seawater inlet SW1 may be located about 5 m lower than a sea surface, and the seawater supply valve B1 may be provided in an upstream of the seawater pump 140 on the seawater supply line L1.

The seawater discharge line L2 may connect the heat source heat exchanger 110 and the seawater outlet SW2, and may discharge seawater discharged from the heat source heat exchanger 110 to the seawater outlet SW2.

The seawater discharge line L2 may be provided with a seawater discharge valve B2, and at least a part of the seawater discharge line L2 may be disposed below the sea surface. Herein, the seawater outlet SW2 may be located about 1.6 m below the sea surface, and the seawater discharge valve B2 may be provided in a downstream of a branch point of a circulation connection line L3a on the seawater discharge line L2.

The circulation connection line L3 is branched from the seawater discharge line L2 and connects the seawater supply line L1, and re-supplies the seawater discharged from the seawater discharge line L2 to the seawater supply line so that the seawater flows when the sea water supply apparatus 100a is driven by the close loop operation type, thereby circulating the seawater.

Particularly, the circulation connection line L3 may be branched from an upstream of the seawater discharge valve B2 on the seawater discharge line L2 and be connected between the seawater supply valve L1 and the seawater pump 140 on the seawater supply line L1, and may be provided with a circulation valve B3. Herein, a point, at which the circulation connection line L3 is branched from an upstream of the seawater discharge valve B2 on the seawater discharge line L2, may be located about 20 m above the sea surface.

The circulation connection line L3 in the 00a according to the present exemplary embodiment may be formed of a circulation connection line L3a and an intermediate tank bypass line L3b. Herein, the circulation connection line L3a may include an intermediate tank 150, a circulation valve B3, and an intermediate tank supply valve B6, and the intermediate tank bypass line L3b may be configured to bypass the intermediate tank 150 on the circulation connection line L3a and include an intermediate tank bypass valve B5.

The circulation valve B3 may be provided to be closer to the branch point of the seawater discharge line L2 than the intermediate tank 150 on the circulation connection line L3a, and the intermediate tank supply valve B6 may be provided to be closer to the intermediate tank 150 than the branch point of the seawater discharge line L2 on the circulation connection line L3a.

When the intermediate tank 150 is fully filled with seawater, the bypass line L3b may cause the seawater flowing the circulation connection line L3a to bypass the intermediate tank 150.

The pressure maintaining device connection line L4 connects the pressure maintaining device 130 and the circulation connection line L3a, and when the sea water supply apparatus 100a is driven in the close loop operation type, the pressure maintaining device connection line L4 may supply the seawater stored inside the pressure maintaining device 130 to the circulation connection line L3a. Herein, the pressure maintaining device connection line L4 may be provided with a pressure maintaining device supply valve B4.

Hereinafter, the individual configurations organically formed by the lines L1 to L4 and implementing the sea water supply apparatus 100a will be described.

The heat source heat exchanger 110 may be connected with the seawater supply line L1 and the seawater discharge line L2, and may be disposed at a position above the sea surface, that is, a position about 30 m above the sea surface.

The heat source heat exchanger 110 may receive the seawater through the seawater supply line L1 and transfer a heat source to an intermediate heat medium, and may discharge the seawater, which is heat exchanged with the intermediate heat medium, through the seawater discharge line L2.

Herein, the heat source heat exchanger 110 may be a shell & tube type or a Printed Circuit Heat Exchanger (PCHE).

The heater 120 may be provided between the heat source heat exchanger 110 and the seawater pump 140 on the seawater supply line L1, and may be disposed at a position above the sea surface, that is, a position about 30 m above the sea surface.

The heater 120 may receive the seawater through the seawater supply line L1, heat the received seawater, and supply the heated seawater to the heat source heat exchanger 110, and may be operated when the sea water supply apparatus 100a is driven in the close loop operation type. That is, when a temperature of the seawater is extremely low and the heat source heat exchanger 110 cannot transfer a heat source to the intermediate heat medium as many as the amount needed, the heater 120 may heat the seawater.

In this case, the heater 120 may receive a heat source, such as steam, from a boiler (of which a reference numeral is not indicated) and heat the seawater, but the heater 120 is not limited thereto, and may be an electric heater.

The pressure maintaining device 130 may be provided on the circulation connection line L3a, and may maintain a pressure of seawater flowing in the circulation connection line L3a.

Particularly, the pressure maintaining device 130 may be connected to a section between a point, at which the circulation connection line L3a is connected with the seawater supply line L1a, and the intermediate tank 150 through the pressure maintaining device connection line L4, and when the sea water supply apparatus 100a is driven in the close loop operation type, the pressure maintaining device 130 may open a pressure maintaining device supply valve L4 and maintain a pressure of the seawater flowing the circulation connection line L3a by using the fluid stored therein.

In this case the pressure maintaining device 130 may be located about 35 m above the sea surface, and may be formed of a container, of which an upper side is opened so as to communicate with the air, thereby maintaining a pressure of the seawater by using atmospheric pressure.

That is, in the exemplary embodiment of the present invention, the pressure maintaining device 130, which is located about 35 m above the sea surface, is connected with the circulation connection line L3a located about 5 m below the sea surface, so that the pressure maintaining device 130 may compensate for the pressure of the seawater flowing into the seawater pump 140 by using a water head (about 40 m, 4 bars) of the seawater, thereby constantly maintaining the pressure of the seawater circulating the circulation connection line L3a, the seawater supply line L1, and the seawater discharge line L2.

The seawater pump 140 may be provided on the seawater supply line L1 to supply the seawater to the re-vaporizing apparatus, that is, the heat source heat exchanger 110.

Particularly, the seawater pump 140 may be provided between the seawater supply valve B1 and the heater 120 on the seawater supply line L1 to pressurize the seawater supplied from the seawater inlet SW1 and supply the pressurized seawater to the heat source heat exchanger 110 via the heater 120.

The seawater pump 140 may be disposed at a position below the sea surface inside the ship body H, and the heat source heat exchanger 110 and the heater 120 may be disposed at a position above the sea surface inside the ship body H. For example, the seawater pump 140 may be disposed at a position about 5 m below the sea surface inside the ship body H, and the heat source heat exchanger 110 and the heater 120 may be disposed at a position 30 m above the sea surface inside the ship body H.

Accordingly, in order to supply the seawater to the heat source heat exchanger 110 and the heater 120 from the seawater pump 140, the seawater pump 140 may pressurize the seawater to a pressure level, in which it is possible to overcome a water head (about 35 m) of the seawater, and for example, the seawater pump 140 may pressurize with a pressure of about 3.5 bars or more.

The intermediate tank 150 is provided on the circulation connection line L3a, and when the operation type of the seawater supply apparatus switched so that the seawater flows from the seawater discharge line L2 to the circulation connection line L3a, that is, the seawater supply apparatus is driven in the close loop operation type, the intermediate tank 150 enables the operation type to be switched non-stop.

Particularly, the intermediate tank 150 may be positioned on the circulation connection line L3a positioned above the sea surface, and in order to implement the switch of the operation type to the close loop operation type non-stop, the intermediate tank 150 may maintain a state in which the seawater is at least partially stored therein.

That is, the intermediate tank 150 is provided on the circulation connection line L3a at the position above the sea surface, so that even when the sea water supply apparatus 100a is driven in the open loop operation type, it is possible to partially store the seawater therein by atmospheric pressure, and the circulation connection line L3a positioned under the intermediate tank 150 is fully filled with the seawater. In this case, a portion inside the intermediate tank 150 above the sea surface is filled with air, and a portion of the circulation connection line L3a above the sea surface is filled with air.

Accordingly, in the present invention, when the operation type of the sea water supply apparatus 100a is switched from the open loop operation type to the close loop operation type, the circulation connection line L3a in the direction of the seawater pump 140 is already fully filled with the seawater, so that it is possible to switch the operation type of the sea water supply apparatus 100a from the open loop operation type to the close loop operation type without a stop.

The intermediate tank 150 may further include an intermediate tank discharge valve B7, which discharges a packing fluid remaining in the circulation connection line L3a.

The intermediate tank discharge valve B7 may open the opening when the operation type of the sea water supply apparatus 100a is switched from the open loop operation type to the close loop operation type and discharge packing fluids, which are gradually concentrated by the seawater coming in the intermediate tank 150 to the outside.

When the operation type of the sea water supply apparatus 100a is switched so that the seawater flows from the seawater discharge line L2 to the circulation connection line L3a, that is, the operation type of the sea water supply apparatus 100a is switched from the open loop operation type to the close loop operation type, the first control unit 170 may control the operation type to be switched non-stop by adjusting the opening of the seawater supply valve B1, the seawater discharge valve B2, the circulation valve B3, the intermediate tank bypass valve B5, and the intermediate tank supply valve B6.

Herein, the first control unit 170 may be connected with the seawater supply valve B1, the seawater discharge valve B2, the circulation valve B3, the intermediate tank bypass valve B5, and the intermediate tank supply valve B6 wiredly or wirelessly to adjust the opening of the valves B1 to B6.

When the operation type of the sea water supply apparatus 100a is switched from the open loop operation type to the close loop operation type, the first control unit 170 may open the circulation valve B3 and the intermediate tank supply valve B6 until the intermediate tank 150 is fully filled with the seawater.

Particularly, when the operation type of the sea water supply apparatus 100a is switched from the open loop operation type to the close loop operation type, the first control unit 170 may control the seawater supply valve B1 and the seawater discharge valve B2 to maintain the open states, and control the intermediate tank bypass valve B5 to maintain the close state, and control the circulation valve B3 and the intermediate tank supply valve B6 be switched from the close state to the open state.

In this case, the seawater is supplied from the seawater inlet SW1 and is discharged to the seawater outlet SW2 through the seawater discharge line L2 via the seawater supply line L1, and simultaneously at least a part of the seawater passing through the seawater discharge line L2 flows into the circulation connection line L3a, so that the intermediate tank 150 is filled with the seawater.

That is, the operation type of the sea water supply apparatus 100a may be continuously switched from the open loop operation type to the close loop operation type without a stop of the operation of the seawater pump 140.

The first control unit 170 may control the circulation valve B3 and the intermediate tank supply valve B6 to maintain the open states until the intermediate tank 150 is fully filled with the seawater and control the circulation valve B3 to maintain the open state at the moment at which the intermediate tank 150 is fully filled with the seawater, but may control the seawater supply valve B1, the seawater discharge valve B2, and the intermediate tank supply valve B6 to be closed and control the intermediate tank bypass valve B5 to be opened.

In this case, the seawater is supplied from the seawater pump 140, passes through the seawater supply line L1, and flows into the circulation connection line L3a through the seawater discharge line L2, and the seawater flowing into the circulation connection line L3a passes through the intermediate tank bypass line L3b, is joined to the circulation connection line L3a again, and then is supplied to the seawater supply line L1, so that the seawater circulates in the close loop. That is, the seawater continuously circulates the seawater supply line L1, the seawater discharge line L2, the circulation connection line L3a, the intermediate tank bypass line L3b, the circulation connection line L3a, and the seawater supply line L1.

As described above, in the exemplary embodiment of the present invention, when the operation type of the sea water supply apparatus 100a is switched from the open loop operation type to the close loop operation type, it is possible to stably remove the packing fluid, that is, air, remaining inside the circulation connection line L3a, so that the operation type may be switched non-stop, thereby achieving an effect in that it is possible to smoothly supply the re-vaporized liquefied gas to the demander 60.

Figure 3:
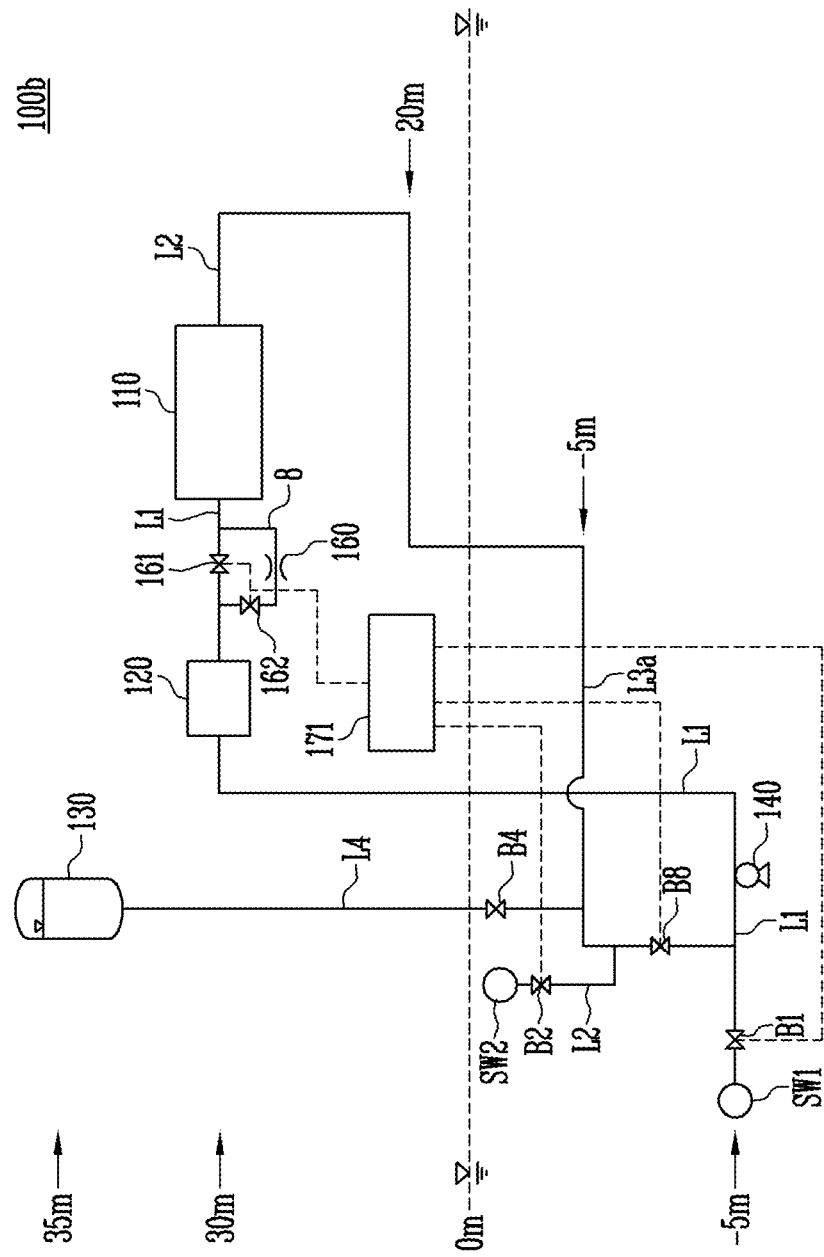
FIG. 3 is a conceptual diagram of a seawater supply apparatus according to a second exemplary embodiment of the present invention.

FIG. 3 is a conceptual diagram of a seawater supply apparatus according to a second exemplary embodiment of the present invention.

As illustrated in FIG. 3, a seawater supply apparatus 100b includes a heat source heat exchanger 110, a heater 120, a pressure maintaining device 130, a seawater pump 140, an orifice 160, a second control unit 171, and a non-stop switch valve B8.

Herein, the heat source heat exchanger 110, the heater 120, the pressure maintaining device 130, and the seawater pump 140 are the same as those of the sea water supply apparatus 100a according to the first exemplary embodiment of the present invention, thereby being replaced with those of the sea water supply apparatus 100a according to the first exemplary embodiment of the present invention.

Before describing an individual configuration of the sea water supply apparatus 100b of the exemplary embodiment of the present invention, basic flow paths organically connecting the individual configurations will be described. Herein, a flow path is a passage, through which a fluid flows, and may mean a line, but is not limited thereto, and any configuration, in which a fluid flows, is acceptable.

In the exemplary embodiment of the present invention, the sea water supply apparatus 100b may further include a seawater supply line L1, a seawater discharge line L2, a circulation connection line L3, and a pressure maintaining device connection line L4. A valve (not illustrated), of which an opening level is adjustable, may be installed in each line, and the amount of seawater or fluid supplied may be controlled according to the adjustment of the opening level of each valve. Herein, the seawater supply line L1, the seawater discharge line L2, and the pressure maintaining device connection line L4 are the same as those of the sea water supply apparatus 100a according to the first exemplary embodiment of the present invention, thereby being replaced with those of the sea water supply apparatus 100a according to the first exemplary embodiment of the present invention.

The circulation connection line L3 is branched from the seawater discharge line L2 and is connected with the seawater supply line L1, and the sea water supply apparatus 100b re-supplies the seawater discharged to the seawater discharge line L2 to the seawater supply line L1 so that the seawater flows when the sea water supply apparatus 100b is driven in the close loop operation type, thereby circulating the seawater.

Particularly, the circulation connection line L3 may be branched from an upstream of the seawater discharge valve B2 on the seawater discharge line L2 and be connected between the seawater supply valve L1 and the seawater pump 140 on the seawater supply line L1, and may be provided with a non-stop switch valve B8. Herein, a point, at which the circulation connection line L3 is branched from an upstream of the seawater discharge valve B2 on the seawater discharge line L2 may be positioned at a position about 5 m below the sea surface.

Hereinafter, the individual configurations organically formed by the lines L1 to L4 and implementing the sea water supply apparatus 100b will be described.

When the operation type of the sea water supply apparatus 100b is switched so that the seawater flows from the seawater discharge line L2 to the circulation connection line L3, that is, the operation of the sea water supply apparatus 100b is switched from the open loop operation type to the close loop operation type or the sea water supply apparatus 100b is driven in the close loop operation type, the orifice 160 adjusts a pressure of the seawater supplied to the heat source heat exchanger 110 through the seawater supply line L1. That is, the when the sea water supply apparatus 100b is driven in the close loop operation type, the orifice 160 may decrease the pressure of the seawater supplied to the heat source heat exchanger 110 and supply the seawater.

Herein, the orifice 160 is a decompression device and may have a shape, of which a center portion is concavely depressed, and the present invention is not limited thereto, and as long as a device is capable of decompressing seawater, the orifice 160 may be replaced with various devices.

In the exemplary embodiment of the present invention, even when the operation type of the sea water supply apparatus 100b is switched from the open loop operation type to the close loop operation type, the seawater pump 140 does not change the pressure of the discharged seawater. Accordingly, when the seawater flows a closed loop space, a water head of the seawater is removed, so that the pressurization through the seawater pump 140 is not much required.

That is, the seawater pump 140 compensates for pressure loss according to internal resistance of the devices, for example, the heater 120 or the heat source heat exchanger 110, using the seawater in the close loop operation type, and the seawater pump 140 uses the pressure used in the open loop operation type as it is, so that the pressure excessively flows into the heater 120 or the heat source heat exchanger 110 to cause a problem in that vibrations and noise are generated.

In order to solve the problem, in the exemplary embodiment of the present invention, the sea water supply apparatus 100b further include an orifice bypass line L8, a seawater blocking valve 161, and a bypass valve 162, in addition to the orifice 160, and when the sea water supply apparatus 100b is driven in the open loop operation type, the orifice 160 is not used, and when the sea water supply apparatus 100b is driven in the close loop operation type, thereby solving the vibration and noise problems.

Herein, the orifice 160 may be provided on the orifice bypass line L8, and may decompress the flowing-in seawater, and then supply the seawater to the heat source heat exchanger 110.

The seawater blocking valve 161 may be provided between the heater 120 and the heat source heat exchanger 110 on the seawater supply line L1, and when the sea water supply apparatus 100b is driven in the open loop operation type, the seawater blocking valve 161 may be opened, and when the sea water supply apparatus 100b is driven in the close loop operation type, the seawater blocking valve 161 may be closed.

The bypass valve 162 may be provided in the upstream of the orifice 160 on the orifice bypass line L8, so that when the sea water supply apparatus 100b is driven in the open loop operation type, the bypass valve 162 may be closed, and when the sea water supply apparatus 100b is driven in the close loop operation type, the bypass valve 162 may be opened.

The orifice bypass line L8 may be branched between the heater 120 and the seawater blocking valve 161 on the seawater supply line L1 and be connected between the seawater blocking valve 161 and the heat source heat exchanger 110 again, and when the sea water supply apparatus 100b is driven in the open loop operation type, the seawater does not flow in and when the sea water supply apparatus 100b is driven in the close loop operation type, the seawater flows in, so that the seawater may be supplied to the heat source heat exchanger 110 in the state of bypassing the seawater blocking valve 161.

Accordingly, in the exemplary embodiment of the present invention, the seawater supply apparatus 100b includes the orifice 160, the orifice bypass line L8, the seawater blocking valve 161, and the bypass valve 162 and supplies the decompressed seawater to the heat source heat exchanger 110, so that there is an effect in that vibrations and noise are decreased.

When the operation type of the sea water supply apparatus 100b is switched so that the seawater flows from the seawater discharge line L2 to the circulation connection line L3, that is, the operation type of the sea water supply apparatus 100b is switched from the open loop operation type to the close loop operation type, the second control unit 171 may control the operation type to be switched non-stop by adjusting the opening of the seawater supply valve B1, the seawater discharge valve B2, and the non-stop switch valve B8.

Herein, the second control unit 171 may be connected with the seawater supply valve B1, the seawater discharge valve B2, and the non-stop switch valve B8 wiredly or wirelessly and adjust the opening level of each of the valves B1, B2, and B8.

When the operation type of the sea water supply apparatus 100b is switched so that the seawater flows from the seawater discharge line L2 to the circulation connection line L3, that is, the operation type of the sea water supply apparatus 100b is switched from the open loop operation type to the close loop operation type, the second control unit 171 may control the seawater to circulate the seawater supply line L1, L2, and L3 by opening the opening level of the non-stop switch valve B8 and closing the opening level of the seawater discharge valve B2.

Particularly, when the operation type of the sea water supply apparatus 100b is switched from the open loop operation type to the close loop operation type, the second control unit 171 may immediately control the non-stop switch valve B8 to be opened and the seawater supply valve B1 and the seawater discharge valve B2 to be closed.

That is, the switch of the operation type of the heat source heat exchanger 110b from the open loop operation type to the close loop operation type may be continuously performed without a stop of the operation of the seawater pump 140.

In this case, the seawater is supplied from the seawater pump 140, passes through the seawater supply line L1, and flows into the circulation connection line L3 through the seawater discharge line L2, and the seawater flowing into the circulation connection line L3 is supplied to the seawater supply line L1, so that the seawater circulates in the close loop. That is, the seawater continuously circulates the seawater supply line L1, the seawater discharge line L2, the circulation connection line L3, and L1.

Further, when the operation type of the sea water supply apparatus 100b is switched so that the seawater flows from the seawater discharge line L2 to the circulation connection line L3, that is, the operation type of the sea water supply apparatus 100b is switched from the open loop operation type to the close loop operation type, or is driven in the close loop operation type, the second control unit 171 may control an inflow of the seawater to the orifice 160 (decompressing device) by adjusting the opening of the seawater blocking valve 161 and the bypass valve 162.

Herein, the second control unit 171 may be connected with the seawater blocking valve 161 and the bypass valve 162 wiredly or wirelessly, and adjust the opening level of each of the valves 161 and 162.

When the operation type of the sea water supply apparatus 100b is switched so that the seawater flows from the seawater discharge line L2 to the circulation connection line L3, the second control unit 171 controls the seawater to be supplied to the orifice 160 by closing the seawater blocking valve 161 and opening the bypass valve 162, so that the heat source heat exchanger 110 may receive the seawater decompressed by the orifice 160.

The non-stop switch valve B8 is provided on the circulation connection line, and when the operation type of the seawater supply apparatus 10b is switched so that the seawater flows from the seawater discharge line L2 to the circulation connection line L3, that is, the operation type of the seawater supply apparatus 100b is switched from the open loop operation type to the close loop operation type, the non-stop switch valve B8 enables the operation type to be switched non-stop.

Particularly, the non-stop switch valve B8 is provided on the circulation connection line L3 located lower than the seawater surface, and for example, the non-stop switch valve B8 may be provided on the circulation connection line L3, which is located about 5 m lower than the seawater surface.

Accordingly, the non-stop switch valve B8 is located about 5 m below the seawater surface and simultaneously, the point, at which the circulation connection line L3 is branched from the upstream of the seawater discharge valve B2 on the seawater discharge line L2, is also located about 5 m lower than the seawater surface, so that the circulation connection line L3 is fully filled with the seawater and there is no remaking packing fluid in the circulation connection line L3.

That is, even when the sea water supply apparatus 100b is driven in the open loop operation type, the non-stop switch valve B8 enables the circulation connection line L3 to be completely filled with the seawater without the remaining packing fluid, so that there is no remaining packing fluid, which prevents the operation type of the sea water supply apparatus 100b from being switch from the open loop operation type to the close loop operation type non-stop, thereby achieving an effect in that the switch of the operation type is performed non-stop.

As described above, in the exemplary embodiment of the present invention, even in the open loop operation type, the circulation connection line L3 is completely filled with the seawater without the remaining packing fluid, so that the operation type of the sea water supply apparatus 100b may be switched from the open loop operation type to the close loop operation type non-stop, thereby achieving an effect in that the re-vaporized liquefied gas is smoothly supplied to the demander 60.

Figure 4:
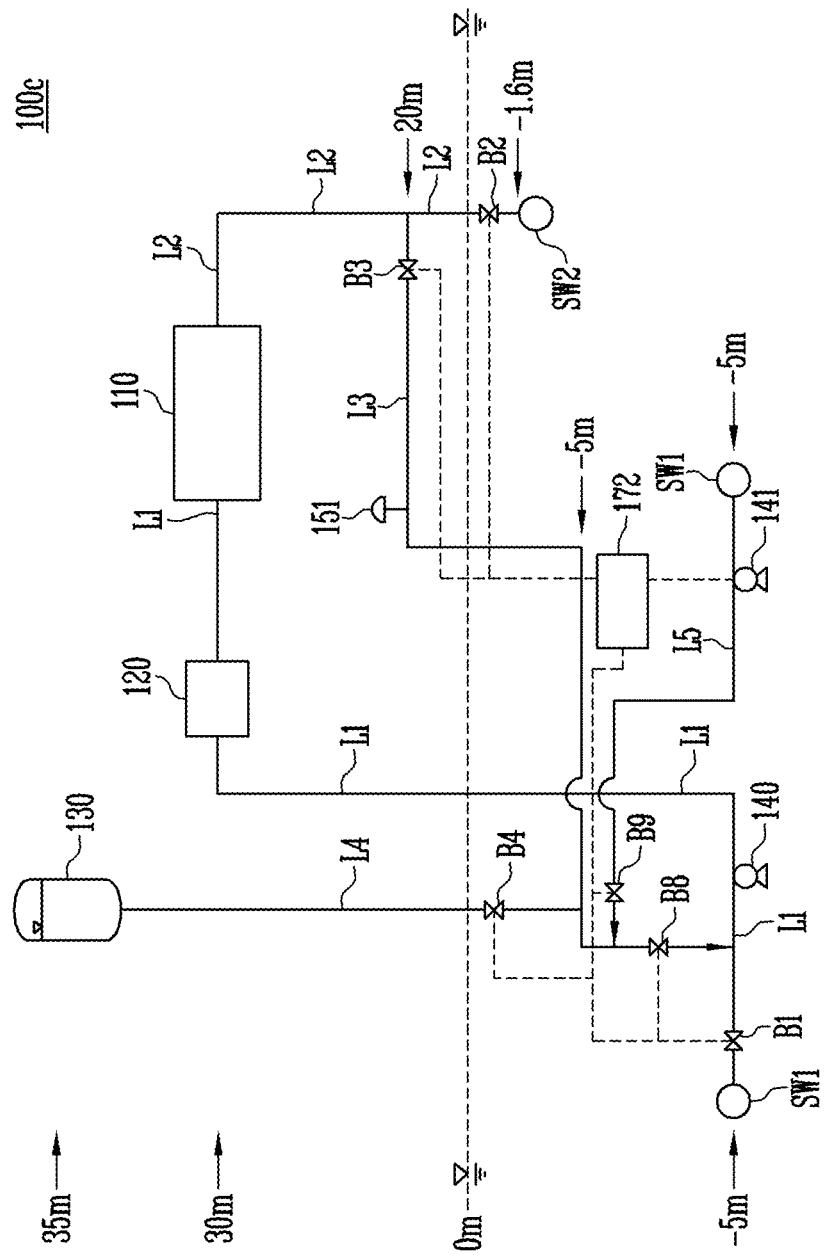
FIG. 4 is a conceptual diagram of a seawater supply apparatus according to a third exemplary embodiment of the present invention.

FIG. 4 is a conceptual diagram of a seawater supply apparatus according to a third exemplary embodiment of the present invention.

As illustrated in FIG. 4, a seawater supply apparatus 100c includes a heat source heat exchanger 110, a heater 120, a pressure maintaining device 130, a seawater pump 140, a ballast pump 141, and a third control unit 172.

Herein, the heat source heat exchanger 110, the heater 120, the pressure maintaining device 130, and the seawater pump 140 are the same as those described in the seawater supply apparatuses 100a and 100b according to the first and second embodiments of the present invention, thereby being replaced with those of the seawater supply apparatuses 100a and 100b according to the first and second embodiments of the present invention.

Before describing the individual configuration of the sea water supply apparatus 100c of the present embodiment of the present invention, basic flow paths organically connecting the individual configurations will be described. Herein, a flow path is a passage, through which a fluid flows, and may mean a line, but is not limited thereto, and any configuration, in which a fluid flows, is acceptable.

In the exemplary embodiment of the present invention, the sea water supply apparatus 100c may further include a seawater supply line L1, a seawater discharge line L2, a circulation connection line L3, a pressure maintaining device connection line L4, and a fluid supply line L5. A valve (not illustrated), of which an opening level is adjustable, may be installed in each line, and the amount of seawater or fluid supplied may be controlled according to the adjustment of the opening level of each valve.

Herein, the seawater supply line L1, the seawater discharge line L2, the circulation connection line L3, and the pressure maintaining device connection line L4 are the same as those described in the seawater supply apparatuses 100a and 100b according to the first and second embodiments of the present invention, thereby being replaced with those of the seawater supply apparatuses 100a and 100b according to the first and second embodiments of the present invention.

The fluid supply line L5 connects a seawater inlet SW1 and an upstream of a non-stop switch valve B8 on the circulation connection line L3, and is provided with the ballast pump 141 and a fluid supply valve B9, and the fluid supply line L5 supplies ballast water supplied through the ballast pump 141 to the circulation connection line L3 so that the seawater flows in the circulation connection line L3 when the sea water supply apparatus 100c is driven in the close loop operation type, thereby removing a packing fluid remaining in the circulation connection line L3.

Particularly, the fluid supply line L5 connects the seawater inlet SW1 and a space between the non-stop switch valve B8 and a circulation valve B3 on the circulation connection line L3, and when the sea water supply apparatus 100c is switched so that the seawater flows from the seawater discharge line L2 to the circulation connection line L3, the fluid supply line L5 supplies the fluid to the circulation connection line L3.

Herein, a point, at which the fluid supply line L5 is connected with the upstream of the non-stop switch valve B8 on the circulation connection line L3, may be located about 5 m lower than the seawater surface.

Hereinafter, the individual configurations organically formed by the lines L1 to L5 and implementing the sea water supply apparatus 100c will be described.

The ballast pump 141 may be provided on the fluid supply line L5 and supply the fluid to the circulation connection line L3.

Particularly, the ballast pump 141 is provided between the seawater outlet SW1 and the fluid supply valve B9 on the fluid supply line L5, and may supply ballast water controlling balance of the ship body H to a predetermined ballast storage room (not illustrated) within the ship body H, and simultaneously, when the sea water supply apparatus 100c is switched so that the seawater flows from the seawater discharge line L2 to the circulation connection line L3, that is, the sea water supply apparatus 100c is driven in the close loop driving type, the ballast pump 141 may supply the fluid for removing the packing fluid remaining in the circulation connection line L3 to the circulation connection line L3.

Herein, the ballast pump 141 may be a centrifugal type.

When the operation type of the sea water supply apparatus 100c is switched so that the seawater flows from the seawater discharge line L2 to the circulation connection line L3, that is, the operation type of the sea water supply apparatus 100c is switched from the open loop operation type to the close loop operation type, the third control unit 172 may control the operation type to be switched non-stop by adjusting the opening of the seawater supply valve B1, the seawater discharge valve B2, the circulation valve B3, the non-stop switch valve B8, and the fluid supply valve B9, and controlling the operation of the ballast pump 141.

Herein, the third control unit 172 may be connected with the seawater supply valve B1, the seawater discharge valve B2, the circulation valve B3, the non-stop switch valve B8, and the ballast pump 14 wiredly or wirelessly to adjust the opening of the valves B1 to B3, B8, and B9.

When the operation type of the sea water supply apparatus 100c is switched so that the seawater flows from the seawater discharge line L2 to the circulation connection line L3, that is, the operation type of the sea water supply apparatus 100c is switched from the open loop operation type to the close loop operation type, the third control unit 172 may control the ballast water to be supplied to the circulation connection line L3 by opening the fluid supply valve B9 and operating the ballast pump 141.

Particularly, when the operation type of the sea water supply apparatus 100c is switched so that the seawater flows from the seawater discharge line L2 to the circulation connection line L3, that is, the operation type of the sea water supply apparatus 100c is switched from the open loop operation type to the close loop operation type, the third control unit 172 may control the non-stop switch valve B8 and the circulation valve B3 to maintain the close state, and control the state of the fluid supply valve B9 to be switched to the close state to the open state, and control the ballast pump 141 to be operated.

In this case, the seawater is supplied from a seawater outlet SW2 and is discharged to a seawater outlet SW2 through the seawater discharge line L2 via the seawater supply line L1, and simultaneously the ballast water flows into the circulation connection line L3 through the ballast pump 141 via the fluid supply line L5 and the circulation connection line L3 is filled with the ballast water. The packing fluid remaining in the circulation connection line L3 may be pushed by the ballast water and be removed through an air removal valve 151. The air removal valve 151 may be provided on the circulation connection line L3.

That is, without the stop of the operation of the seawater pump 140, the operation type of the sea water supply apparatus 100c may be continuously switched from the open loop operation type to the close loop operation type.

The third control unit 172 may control the fluid supply valve B9 to maintain the open state until the circulation connection line L3 is fully filled with the seawater, and control the seawater supply valve B1, the seawater discharge valve B2, and the fluid supply valve B9 to be closed, control the operation of the ballast pump 141 to be stopped, and control the circulation valve B3 and the non-stop switch valve B8 to be opened at the moment, at which the circulation connection line L3 is fully filled with the seawater.

In this case, the seawater is supplied from the seawater pump 140, passes through the seawater supply line L1, and flows into the circulation connection line L3 through the seawater discharge line L2, and the seawater flowing into the circulation connection line L3 is supplied to the seawater supply line L1 again, so that the seawater circulates in the close loop. That is, the seawater continuously circulates the seawater supply line L1, the seawater discharge line L2, the circulation connection line L3, and L1.

Further, in the exemplary embodiment of the present invention, the fluid inside the pressure maintaining device 130 is supplied to the circulation connection line L3, so that when the operation type of the sea water supply apparatus 100c is switched from the open loop operation type to the close loop operation type, the packing fluid remaining inside the circulation connection line L3 may be removed.

Particularly, when the operation type of the sea water supply apparatus 100c is switched so that the seawater flows from the seawater discharge line L2 to the circulation connection line L3, that is, the operation type of the sea water supply apparatus 100c is switched from the open loop operation type to the close loop operation type, the third control unit 172 may control the operation type to be switched non-stop by adjusting the opening of the seawater supply valve B1, the seawater discharge valve B2, the circulation valve B3, the non-stop switch valve B8, and the pressure maintaining device supply valve B4.

Herein, the third control unit 172 may be connected with the seawater supply valve B1, the seawater discharge valve B2, the circulation valve B3, the non-stop switch valve B8, and the pressure maintaining device supply valve B4 wiredly or wirelessly to adjust the opening of the valves B1 to B4, and B8.

When the operation type of the sea water supply apparatus 100c is switched so that the seawater flows from the seawater discharge line L2 to the circulation connection line L3, that is, the operation type of the sea water supply apparatus 100c is switched from the open loop operation type to the close loop operation type, the third control unit 172 may control the fluid stored inside the pressure maintaining device 130 to be supplied to the circulation connection line L3 by opening the pressure maintaining device supply valve B4.

Particularly, when the operation type of the sea water supply apparatus 100c is switched so that the seawater flows from the seawater discharge line L2 to the circulation connection line L3, that is, the operation type of the sea water supply apparatus 100c is switched from the open loop operation type to the close loop operation type, the third control unit 172 may control the non-stop switch valve B8 and the circulation valve B3 to maintain the close state, and control the state of the pressure maintaining device supply valve B4 to be switched to the close state to the open state.

In this case, the seawater is supplied from the seawater inlet SW1 and is discharged to the seawater outlet SW2 through the seawater discharge line L2 via the seawater supply line L1, and simultaneously, the fluid stored inside the pressure maintaining device 130 via the fluid supply line L4 flows into the circulation connection line L3 and the circulation connection line L3 is filled with the fluid. The packing fluid remaining inside the circulation connection line L3 may be pulled by the fluid and removed through the air removal valve 151. The air removal valve 151 may be provided on the circulation connection line L3, and herein, the fluid may be seawater.

That is, without the stop of the operation of the seawater pump 140, the operation type of the sea water supply apparatus 100c may be continuously switched from the open loop operation type to the close loop operation type.

The third control unit 172 may control the pressure maintaining device supply valve B4 to maintain the open state until the circulation connection line L3 is fully filled with the seawater, and control the seawater supply valve B1 and the seawater discharge valve B2 to be closed and control the operation of the circulation valve B3 and the non-stop switch valve B8 to be opened at the moment, at which the circulation connection line L3 is fully filled with the seawater. The pressure maintaining device supply valve B4 maintains the open state even at the moment, at which the circulation connection line L3 is fully filled with the seawater, so that when the sea water supply apparatus 100c is driven in the close loop operation type, the pressure of the seawater flowing in the circulation connection line L3 may be maintained.

Herein, the pressure maintaining device 130 may be connected with a fire suppression firefighting water storage tank (not illustrated), which stores firefighting water for suppressing fire, and may receive firefighting water from the firefighting water storage tank while the operation type of the sea water supply apparatus 100c is switched from the open loop operation type to the close loop operation type.

In this case, the seawater is supplied from the seawater pump 140, passes through the seawater supply line L1, and flows into the circulation connection line L3 through the seawater discharge line L2, and the seawater flowing into the circulation connection line L3 is supplied to the seawater supply line L1 again, so that the seawater circulates in the close loop. That is, the seawater continuously circulates the seawater supply line L1, the seawater discharge line L2, the circulation connection line L3, and L1.

As described above, in the exemplary embodiment of the present invention, when the operation type of the sea water supply apparatus 100c is switched from the open loop operation type to the close loop operation type, the packing fluid, that is, air, remaining inside the circulation connection line L3 may be stably removed, so that the switch of the operation type may be performed non-stop, and thus there is an effect in that the re-vaporized liquefied gas is smoothly supplied to the demander 60.

Figure 5:
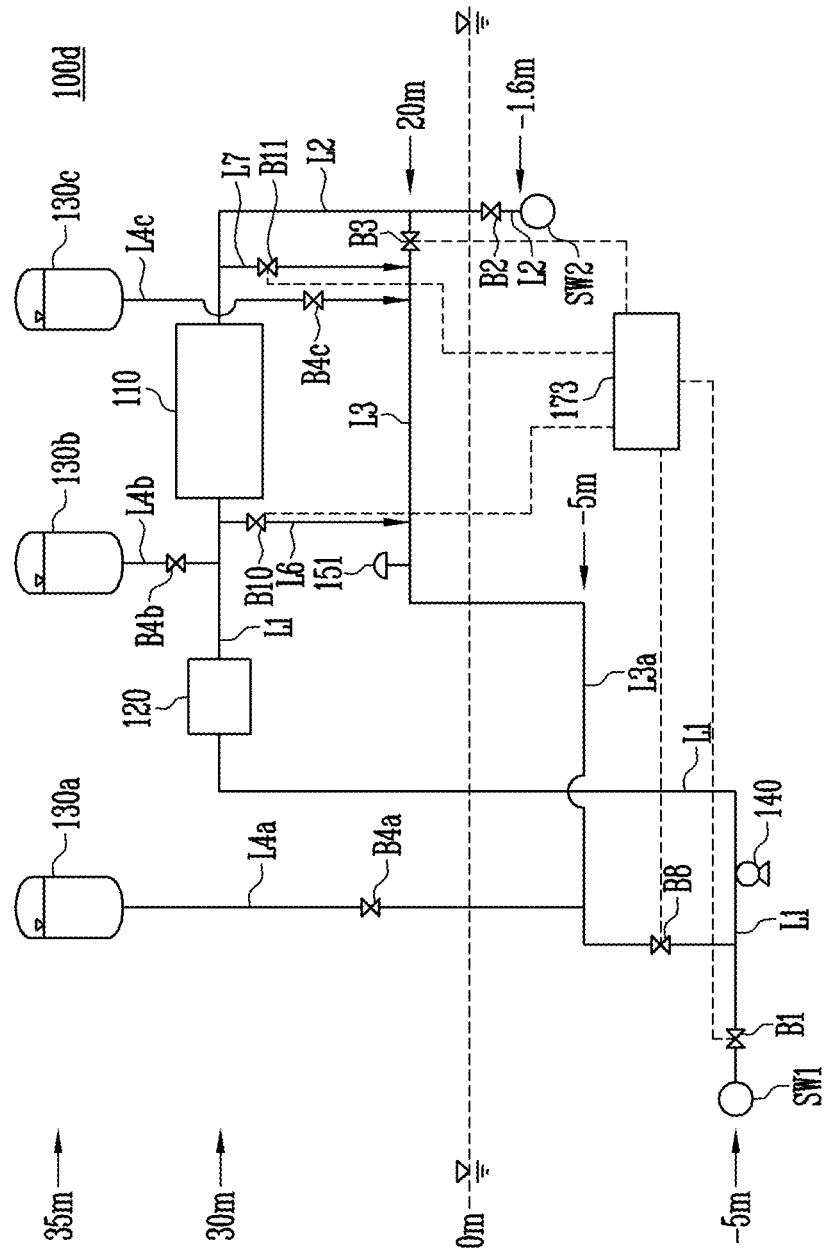
FIG. 5 is a conceptual diagram of a seawater supply apparatus according to a fourth exemplary embodiment of the present invention.

FIG. 5 is a conceptual diagram of a seawater supply apparatus according to a fourth exemplary embodiment of the present invention.

As illustrated in FIG. 5, a seawater supply apparatus 100d includes a heat source heat exchanger 110, a heater 120, pressure maintaining devices 130a, 130b, and 130c, a seawater pump 140, and a third control unit 173.

Herein, the heat source heat exchanger 110, the heater 120, and the seawater pump 140 are the same as those described in the seawater supply apparatuses 100a, 100b, and 100c according to the first to third exemplary embodiments of the present invention, thereby being replaced with those described in the seawater supply apparatuses 100a, 100b, and 100c according to the first to third exemplary embodiments of the present invention.

Before describing an individual configuration of the sea water supply apparatus 100d of the exemplary embodiment of the present invention, basic flow paths organically connecting the individual configurations will be described. Herein, a flow path is a passage, through which a fluid flows, and may mean a line, but is not limited thereto, and any configuration, in which a fluid flows, is acceptable.

In the exemplary embodiment of the present invention, the sea water supply apparatus 100d may further include a seawater supply line, a seawater discharge line L2, a circulation connection line L3, a first pressure maintaining device connection line L4a, a second pressure maintaining device connection line L4b, a third pressure maintaining device connection line L4c, a first branch line L6, and a second branch line L7. A valve (not illustrated), of which an opening level is adjustable, may be installed in each line, and the amount of seawater or fluid supplied may be controlled according to the adjustment of the opening level of each valve.

Herein, the seawater supply line L1 and the seawater discharge line L2 are the same as those described in the seawater supply apparatuses 100a, 100b, and 100c according to the first to third exemplary embodiments of the present invention, and the first pressure maintaining device connection line L4a is the same as the pressure maintaining device connection line L4 described in the seawater supply apparatuses 100a, 100b, and 100c according to the first to third exemplary embodiments of the present invention, thereby being replaced with the pressure maintaining device connection line L4 described in the seawater supply apparatuses 100a, 100b, and 100c according to the first to third exemplary embodiments of the present invention.

The second pressure maintaining device connection line L4b connects a pressure maintaining device 130b and a space between the heater 120 and the heat source heat exchanger 110 on the seawater supply line L1, and supply the seawater stored inside the pressure maintaining device 130b to the circulation connection line L3 when the sea water supply apparatus 100d is driven in the close loop operation type. Herein, the second pressure maintaining device connection line L4b is located at the upper side than the seawater surface, and may be connected with the seawater supply line L1 located at a position about 30 m higher than the seawater surface, and may be provided with a second pressure maintaining device supply valve B4b.

The third pressure maintaining device connection line L4c connects the pressure maintaining device 130c and a line at a position higher than the seawater surface in the space between the non-stop switch valve B8 and the circulation valve B3 on the circulation connection line L3, and when the sea water supply apparatus 100d is driven in the close loop operation type, the third pressure maintaining device connection line L4c may supply the seawater stored inside the pressure maintaining device 130c to the circulation connection line L3. Herein, the third pressure maintaining device connection line L4c is located at the upper side than the seawater surface, and may be connected with the circulation connection line L3 located at a position about 20 m higher than the seawater surface, and may be provided with a third pressure maintaining device supply valve B4c.

In the exemplary embodiment of the present invention, the circulation connection line L3 is the same as that described in the seawater supply apparatuses 100a, 100b, and 100c according to the first to third exemplary embodiments of the present invention. However, the circulation connection line L3 is slightly different in that when the seawater supply apparatus 100d is switched so that the seawater flows from the seawater discharge line L2 to the circulation connection line L, the circulation connection line L3 may receive the flowing seawater through the seawater supply line L1 or the seawater discharge line L2 to remove the packing fluid remaining therein.

This will be described in the description of first and second branch lines L6 and L7, and a fourth control unit 173.

The first branch line L6 may be branched between the heater 120 and the heat source heat exchanger 110 on the seawater supply line L1 and be connected to the circulation connection line L3, so that when the operation type of the sea water supply apparatus 100d is switched from the open loop operation type to the close loop operation type, the first branch line L6 may supply at least a part of the seawater flowing in the seawater supply line L1 to the circulation connection line L3. Herein, the first branch line L6 may be provided with a first branch valve B10, and may be connected to the circulation connection line L3 arranged at the position above the sea surface.

The second branch line L7 is branched from a space between the heat source heat exchanger 110 on the seawater discharge line L2 and the point, at which the circulation connection line L3 is branched on the seawater discharge line L2 and is connected to the circulation connection line L3, and when the operation type of the sea water supply apparatus 100d is switched from the open loop operation type to the close loop operation type, the second branch line L7 may supply at least a part of the seawater flowing in the seawater supply line L1 to the circulation connection line L3. Herein, the second branch line L7 may be provided with a second branch valve B11, and may be connected to the circulation connection line L3 arranged at the position above the sea surface.

Hereinafter, the individual configurations organically formed by the lines L1 to L4 and implementing the sea water supply apparatus 100d will be described.

The pressure maintaining device 130a may be connected to a line arranged at a position below the sea surface in the space between the non-stop switch valve B8 and the circulation valve B3 on the circulation connection line L3 through the first pressure maintain device connection line L4a, and when the sea water supply apparatus 100d is driven in the close loop operation type, the pressure maintaining device 130a may open a first pressure maintaining device supply valve B4a and maintain the pressure of the seawater flowing in the circulation connection line L3 with the fluid stored therein.

In this case, the pressure maintaining device 130a is located about 35 m above the sea surface, and is formed of a container, of which the upper side is opened so as to communicate with the air, thereby maintaining the pressure of the seawater by using atmospheric pressure.

That is, in the exemplary embodiment of the present invention, the pressure maintaining device 130a, which is located about 35 m above the sea surface, is connected with the circulation connection line L3 located about 5 m below the sea surface, so that the pressure maintaining device 130a may compensate for the pressure of the seawater flowing into the seawater pump 140 by using a water head (about 40 m, 4 bars) of the seawater, thereby constantly maintaining the pressure of the seawater circulating the circulation connection line L3, the seawater supply line L1, and the seawater discharge line L2.

The pressure maintaining device 130b may be connected between the heater 120 and the heat source heat exchanger 110 on the seawater supply line L1 through the second connection line L4b, and when the sea water supply apparatus 100d is driven in the close loop operation type, the pressure maintaining device 130b may maintain the pressure of the seawater flowing in the seawater supply line L1 with the fluid stored therein by opening the second pressure maintaining device supply valve B4b.

In this case, the pressure maintaining device 130b is located about 35 m above the sea surface, and may be formed of a container, of which an upper side is opened so as to communicate with the air, thereby maintaining the pressure of the seawater by using atmospheric pressure, and the seawater supply line L1 connected with the second pressure maintaining device connection line L4b may be located about 30 m above the sea surface.

That is, in the exemplary embodiment of the present invention, the pressure maintaining device 130b, which is located about 35 m above the sea surface, is connected with the seawater supply line L1 located about 30 m above the sea surface, so that the pressure maintaining device 130b may compensate for the pressure of the seawater flowing into the heat source heat exchanger 110 by using a water head (about 5 m, 0.5 bar) of the seawater, thereby constantly maintaining the pressure of the seawater circulating the circulation connection line L3, the seawater supply line L1, and the seawater discharge line L2.

Accordingly, in this case, the length is considerably decreased compared to the first pressure maintaining device connection line L4a, so that there is an advantage in that construction cost is decreased.

The pressure maintaining device 130c may be connected between the heat source heat exchanger 110 on the seawater discharge line L2 and a line arranged at a position below the sea surface between the non-stop switch valve B8 and the circulation valve B3 on the circulation connection line L3 through the third pressure maintain device connection line L4c, and when the sea water supply apparatus 100d is driven in the close loop operation type, the pressure maintaining device 130c may opening the third pressure maintaining device supply valve B4c and maintain the pressure of the seawater flowing in the circulation connection line L3 with the fluid stored therein.

In this case, the pressure maintaining device 130c is located about 35 m above the sea surface, and may be formed of a container, of which an upper side is opened so as to communicate with the air, thereby maintaining the pressure of the seawater by using atmospheric pressure, and the circulation connection line L3 connected with the third pressure maintaining device connection line L4c may be located about 20 m above the sea surface.

That is, in the exemplary embodiment of the present invention, the pressure maintaining device 130c, which is located about 35 m above the sea surface, is connected with the circulation connection line L3 located about 20 m below the sea surface, so that the pressure maintaining device 130c may compensate for the pressure of the seawater flowing into the seawater pump 140 by using a water head (about 15 m, 1.5 bar) of the seawater, thereby constantly maintaining the pressure of the seawater circulating the circulation connection line L3, the seawater supply line L1, and the seawater discharge line L2.

Accordingly, in this case, the length is considerably decreased compared to the first pressure maintaining device connection line L4a, so that there is an advantage in that construction cost is decreased.

When the operation type of the sea water supply apparatus 100c is switched so that the seawater flows from the seawater discharge line L2 to the circulation connection line L3, that is, the operation type of the sea water supply apparatus 100c is switched from the open loop operation type to the close loop operation type, the fourth control unit 173 may control the operation type to be switched non-stop by adjusting the opening of the seawater supply valve B1, the seawater discharge valve B2, the circulation valve B3, the non-stop switch valve B8, the first branch valve B10, and the second branch valve B11.

Herein, the fourth control unit 173 may be connected with the seawater supply valve B1, the seawater discharge valve B2, the circulation valve B3, the non-stop switch valve B8, the first branch valve B10, and the second branch valve B11 wiredly or wirelessly to adjust the opening of the valves B1 to B3, B8, B10, and B11.

When the operation type of the sea water supply apparatus 100d is switched from the open loop operation type to the close loop operation type, the fourth control unit 173 may control the seawater supply valve B1, the seawater discharge valve B2, the circulation valve B3, and the non-stop switch valve B8 without the control of the first branch valve B10 and the second branch valve B11.

That is, when the operation type of the sea water supply apparatus 100d is switched from the open loop operation type to the close loop operation type, the fourth control unit 173 may control at least a part of the seawater discharged to the seawater discharge line L2 to be supplied to the circulation connection line L3 by opening the circulation valve B3.

Particularly, when the operation type of the sea water supply apparatus 100d is switched from the open loop operation type to the close loop operation type, the fourth control unit 173 may control the seawater supply valve B1 and the seawater discharge valve B2 to maintain the open state, and control the non-stop switch valve B8 to maintain the close state, thereby controlling the circulation valve B3 to be switched from the close state to the open state.

In this case, the seawater is supplied from the seawater inlet SW1, passes through the seawater supply line L1, and is discharged to the seawater outlet SW2 through the seawater discharge line L2, and simultaneously at least a part of the seawater passing through the seawater discharge line L2 flows into the circulation connection line L3a, so that the circulation connection line L3 may be filled with the seawater, and the packing fluid remaining in the circulation connection line L3 may be removed through an air removal valve 51.

That is, the operation type of the sea water supply apparatus 100d may be continuously switched from the open loop operation type to the close loop operation type without a stop of the operation of the seawater pump 140.

The fourth control unit 173 may control the circulation valve B3 to maintain the open state, but may control the seawater supply valve B1 and the seawater discharge valve B2 to be closed and the non-stop switch valve B8 to be opened at the moment, at which the circulation connection line L3 is fully filled with the seawater.

In this case, the seawater is supplied from the seawater pump 140, passes through the seawater supply line L1, and flows into the circulation connection line L3 through the seawater discharge line L2, and the seawater flowing into the circulation connection line L3 is supplied to the seawater supply line L1, so that the seawater circulates in the close loop. That is, the seawater continuously circulates the seawater supply line L1, the seawater discharge line L2, the circulation connection line L3, and L1.

Further, when the operation type of the sea water supply apparatus 100d is switched from the open loop operation type to the close loop operation type, the fourth control unit 173 may control only the seawater supply valve B1, the seawater discharge valve B2, the first branch valve B10, and the non-stop switch valve B8 without the control of the second branch valve B11.

That is, when the operation type of the sea water supply apparatus 100d is switched from the open loop operation type to the close loop operation type, the fourth control unit 173 may control at least a part of the seawater supplied to the heat source heat exchanger 110 from the seawater supply line L1 to be supplied to the circulation connection line L3 by opening the first branch valve B10.

Particularly, when the operation type of the sea water supply apparatus 100d is switched from the open loop operation type to the close loop operation type, the fourth control unit 173 may control the seawater supply valve B1 and the seawater discharge valve B2 to maintain the open state, and control the circulation valve B3 and the non-stop switch valve B8 to maintain the close state, thereby controlling the first branch valve B10 to be switched from the close state to the open state.

In this case, the seawater is supplied from the seawater inlet SW1, passes through the seawater supply line L1, and is discharged to the seawater outlet SW2 through the seawater discharge line L2, and simultaneously at least a part of the seawater passing through the seawater supply line L1 flows into the circulation connection line L3, so that the circulation connection line L3 may be filled with the seawater, and the packing fluid remaining in the circulation connection line L3 may be removed through an air removal valve 51.

That is, the operation type of the sea water supply apparatus 100d may be continuously switched from the open loop operation type to the close loop operation type without a stop of the operation of the seawater pump 140.

The fourth control unit 173 may control the circulation valve B3 and the non-stop valve B8 to be opened, control the seawater supply valve B1 and the seawater discharge valve B2 to be closed, and control the first branch valve B10 to be closed at the moment, at which the circulation connection line L3 is fully filled with the seawater.

In this case, the seawater is supplied from the seawater pump 140, passes through the seawater supply line L1, and flows into the circulation connection line L3 through the seawater discharge line L2, and the seawater flowing into the circulation connection line L3 is supplied to the seawater supply line L1, so that the seawater circulates in the close loop. That is, the seawater continuously circulates the seawater supply line L1, the seawater discharge line L2, the circulation connection line L3, and L1.

Further, when the operation type of the sea water supply apparatus 100d is switched from the open loop operation type to the close loop operation type, the fourth control unit 173 may control only the seawater supply valve B1, the seawater discharge valve B2, the second branch valve B11, and the non-stop switch valve B8 without the control of the first branch valve B11.

That is, when the operation type of the sea water supply apparatus 100d is switched from the open loop operation type to the close loop operation type, the fourth control unit 173 may control at least a part of the seawater discharged to the seawater discharge line L2 to be supplied to the circulation connection line L3 by opening the second branch valve B11.

Particularly, when the operation type of the sea water supply apparatus 100d is switched from the open loop operation type to the close loop operation type, the fourth control unit 173 may control the seawater supply valve B1 and the seawater discharge valve B2 to maintain the open state, control the circulation valve B3 and the non-stop switch valve B8 to maintain the close state, and control the second branch valve B11 to be switched from the close state to the open state.

In this case, the seawater is supplied from the seawater inlet SW1, passes through the seawater supply line L1, and is discharged to the seawater outlet SW2 through the seawater discharge line L2, and simultaneously at least a part of the seawater passing through the seawater discharge line L2 flows into the circulation connection line L3a, so that the circulation connection line L3 may be filled with the seawater, and the packing fluid remaining in the circulation connection line L3 may be removed through an air removal valve 51.

That is, the operation type of the sea water supply apparatus 100d may be continuously switched from the open loop operation type to the close loop operation type without a stop of the operation of the seawater pump 140.

The fourth control unit 173 may control the circulation valve B3 and the non-stop valve B8 to be opened, control the seawater supply valve B1 and the seawater discharge valve B2 to be closed, and control the second branch valve B11 to be closed at the moment, at which the circulation connection line L3 is fully filled with the seawater.

In this case, the seawater is supplied from the seawater pump 140, passes through the seawater supply line L1, and flows into the circulation connection line L3 through the seawater discharge line L2, and the seawater flowing into the circulation connection line L3 is supplied to the seawater supply line L1, so that the seawater circulates in the close loop. That is, the seawater continuously circulates the seawater supply line L1, the seawater discharge line L2, the circulation connection line L3, and L1.

As described above, in the exemplary embodiment of the present invention, when the operation type of the sea water supply apparatus 100d is switched from the open loop operation type to the close loop operation type, the packing fluid, that is, air, remaining inside the circulation connection line L3 may be stably removed, so that the switch of the operation type may be performed non-stop, and thus there is an effect in that the re-vaporized liquefied gas is smoothly supplied to the demander 60.

Figure 6:
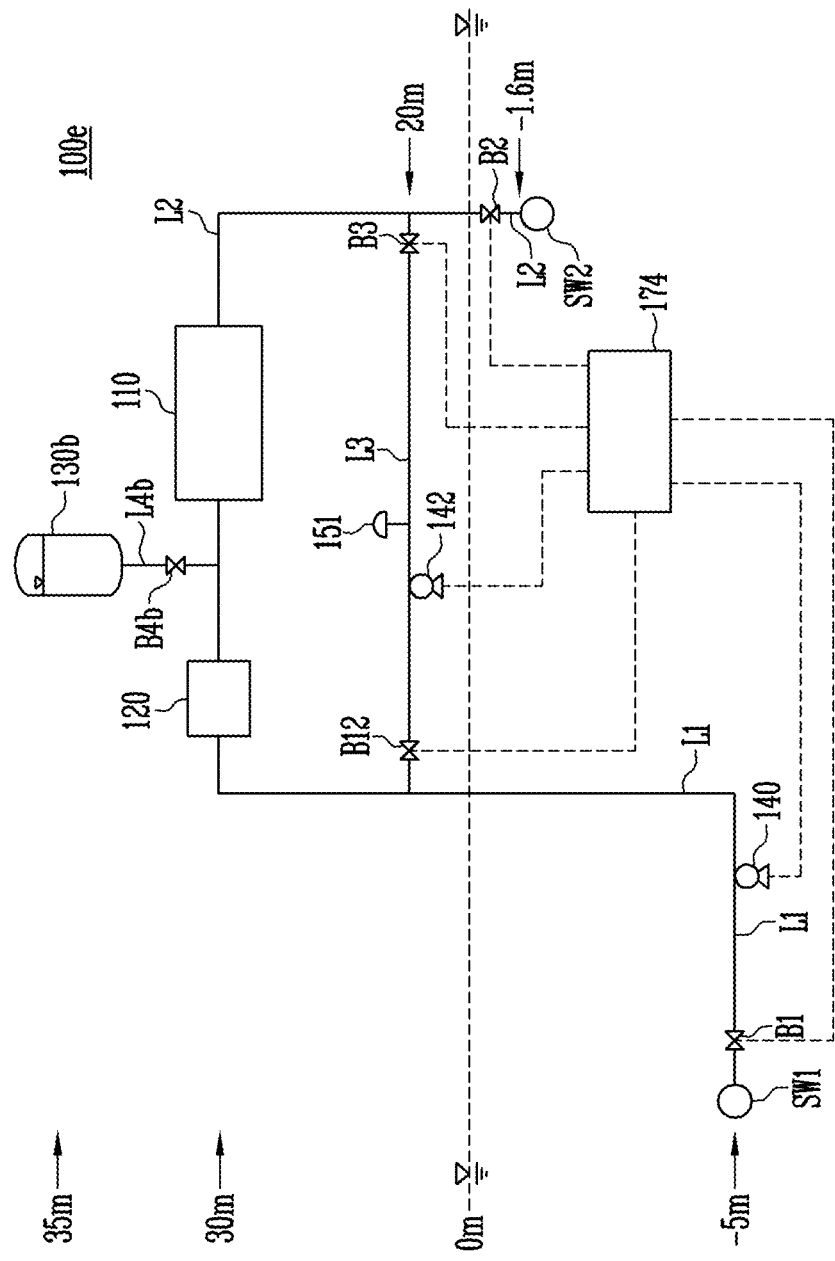
FIG. 6 is a conceptual diagram of a seawater supply apparatus according to a fifth exemplary embodiment of the present invention.

FIG. 6 is a conceptual diagram of a seawater supply apparatus according to a fifth exemplary embodiment of the present invention.

As illustrated in FIG. 6, a seawater supply apparatus 100e includes a heat source heat exchanger 110, a heater 120, a pressure maintaining device 130b, a seawater pump 140, a low pressure pump 142, and a fifth control unit 174.

Herein, the heat source heat exchanger 110, the heater 120, the pressure maintaining device 130b, and the seawater pump 140 are the same as those described in the seawater supply apparatuses 100a, 100b, 100c, and 100d according to the first to fourth embodiments of the present invention, thereby being replaced with those of the seawater supply apparatuses 100a, 100b, 100c, and 100d according to the first to fourth embodiments of the present invention.

Before describing an individual configuration of the sea water supply apparatus 100e of the exemplary embodiment of the present invention, basic flow paths organically connecting the individual configurations will be described. Herein, a flow path is a passage, through which a fluid flows, and may mean a line, but is not limited thereto, and any configuration, in which a fluid flows, is acceptable.

In the exemplary embodiment of the present invention, the sea water supply apparatus 100e may further include a seawater supply line L1, a seawater discharge line L2, a circulation connection line L3, and a second pressure maintaining device connection line L4b. A valve (not illustrated), of which an opening level is adjustable, may be installed in each line, and the amount of seawater or fluid supplied may be controlled according to the adjustment of the opening level of each valve.

Herein, the seawater supply line L1, the seawater discharge line L2, and the second pressure maintaining device connection line L4b are the same as those described in the seawater supply apparatuses 100a, 100b, 100c, and 100d according to the first to fourth embodiments of the present invention, thereby being replaced with those of the seawater supply apparatuses 100a, 100b, 100c, and 100d according to the first to fourth embodiments of the present invention.

In the exemplary embodiment of the present invention, the circulation connection line L3 is the same as that described in the seawater supply apparatuses 100a, 100b, and 100c according to the first to third exemplary embodiments of the present invention. However, there is a slight difference in that a connection portion of the circulation connection line L3 with the seawater supply line L1 is between the seawater pump 140 and the heater 120. This will be described in detail in description of the low-pressure pump 142 and the fifth control unit 174.

Hereinafter, the individual configurations organically formed by the lines L1 to L4b and implementing the sea water supply apparatus 100e will be described.

The low-pressure pump 142 may be provided on the circulation connection line L3 and pressurize the seawater with pressurization capacity smaller than pressurization capacity of the seawater pump 140, and may be driven only when the operation type of the sea water supply apparatus 100e is switched so that the seawater flows from the seawater discharge line L2 to the circulation connection line L3, pressurize the seawater with low pressure, and then supply the pressurized seawater to the heat source heat exchanger 110.

Particularly, when the operation type of the sea water supply apparatus 100e is switched so that the seawater flows from the seawater discharge line L2 to the circulation connection line L3, that is, the operation type of the sea water supply apparatus 100e is switched from the open loop operation type to the close loop operation type or the sea water supply apparatus 100e is driven in the close loop operation type, the low-pressure pump 142 may pressurize the seawater flowing into the circulation connection line L3 through the seawater discharge line L2 with low pressure and supply the pressurized seawater to the heat source heat exchanger 110.

That is, in the exemplary embodiment of the present invention, when the sea water supply apparatus 100e is driven in the open loop operation type, the seawater may be pressurized through the seawater pump 140 and be supplied to the heat source heat exchanger 110, and when the sea water supply apparatus 100e is driven in the close loop operation type, the seawater may be pressurized through the low-pressure pump 142 and be supplied to the heat source heat exchanger 110. Herein, the low-pressure pump 142 may be a centrifugal type.

In the exemplary embodiment, the seawater pump 140 does not change the pressure of the discharged seawater even when the operation type of the sea water supply apparatus 100e is switched from the open loop operation type to the close loop operation type. Accordingly, when the seawater flows a closed loop space, a water head of the seawater is removed, so that the pressurization through the seawater pump 140 is not much required.

That is, the seawater pump 140 supplements pressure loss according to internal resistance of the devices, for example, the heater 120 or the heat source heat exchanger 110, using the seawater in the close loop operation type, and the seawater pump 140 uses the pressure used in the open loop operation type as it is, so that the pressure excessively flows into the heater 120 or the heat source heat exchanger 110 to cause a problem in that vibrations and noise are generated.

In order to solve the problem, in the exemplary embodiment of the present invention, the low-pressure pump 142 is separately provided from the seawater pump 140, so that the seawater pump 140 is used in the open loop operation type and the low-pressure pump 142 is driven in the close loop operation type, thereby solving vibrations and noise problems.

Accordingly, in the exemplary embodiment of the present invention, the low-pressure pump 142, which is separately driven from the seawater pump 140, is provided to supply the seawater with appropriate pressure to the heat source heat exchanger 110, thereby achieving an effect in that vibrations and noise are decreased.

When the operation type of the sea water supply apparatus 100e is switched so that the seawater flows from the seawater discharge line L2 to the circulation connection line L3, that is, the operation type of the sea water supply apparatus 100e is switched from the open loop operation type to the close loop operation type, the fifth control unit 174 may control the operation type to be switched non-stop by adjusting the opening of the seawater supply valve B1, the seawater discharge valve B2, the circulation valve B3, and the switch valve B12, and controlling the operations of the seawater pump 140 and the low-pressure pump 142.

Herein, the fifth control unit 174 may be connected with the seawater supply valve B1, the seawater discharge valve B2, the circulation valve B3, the switch valve B12, the seawater pump 140, and the low-pressure pump 142 wiredly or wirelessly and adjust the opening of each of the valves B1 to B3, and B12 and control the operations of the pumps 140 and 142.

When the operation type of the sea water supply apparatus 100e is switched so that the seawater flows from the seawater discharge line L2 to the circulation connection line L3, that is, the operation type of the sea water supply apparatus 100e is switched from the open loop operation type to the close loop operation type, the fifth control unit 174 may open the circulation valve B3 and control at least a part of the seawater discharged to the seawater discharge line L2 to be supplied to the circulation connection line L3.

Particularly, when the operation type of the sea water supply apparatus 100e is switched from the open loop operation type to the close loop operation type, the fifth control unit 174 may control the seawater supply valve B1 and the seawater discharge valve B2 to maintain the open state and the control the switch valve B12 to maintain the close state, and control the state of the circulation valve B3 to be switched from the closed state to the open state.

In this case, the seawater is supplied from the seawater inlet SW1, passes through the seawater supply line L1, and is discharged to the seawater outlet SW2 through the seawater discharge line L2, and simultaneously at least a part of the seawater passing through the seawater discharge line L2 flows into the circulation connection line L3, so that the circulation connection line L3 may be filled with the seawater, and the packing fluid remaining in the circulation connection line L3 may be removed through an air removal valve 51.

The fifth control unit 174 maintains the circulation valve B3 in the open state, and closes the seawater supply valve B1 and the seawater discharge valve B2 and opens the switch valve B12 at the moment, at which the circulation connection line L3 is fully filled with the seawater, to control the seawater pump 140 to stop the operation and the low-pressure pump 142 to be operated.

In this case, the seawater passes through the seawater supply line L1 and flows into the circulation connection line L3 through the seawater discharge line L2, the seawater flowing into the circulation connection line L3 is pressurized with low pressure through the low-pressure pump 142 and is supplied to the seawater supply line L1, and the seawater circulates in the close loop. That is, the seawater continuously circulates the seawater supply line L1, the seawater discharge line L2, the circulation connection line L3, and L1.

Accordingly, in the exemplary embodiment of the present invention, the low-pressure pump 142, which is separately driven from the seawater pump 140, is provided, and supplies the seawater with the appropriate pressure to the heat source heat exchanger 110, thereby achieving an effect in that vibrations and noise are decreased.

Figure 7:
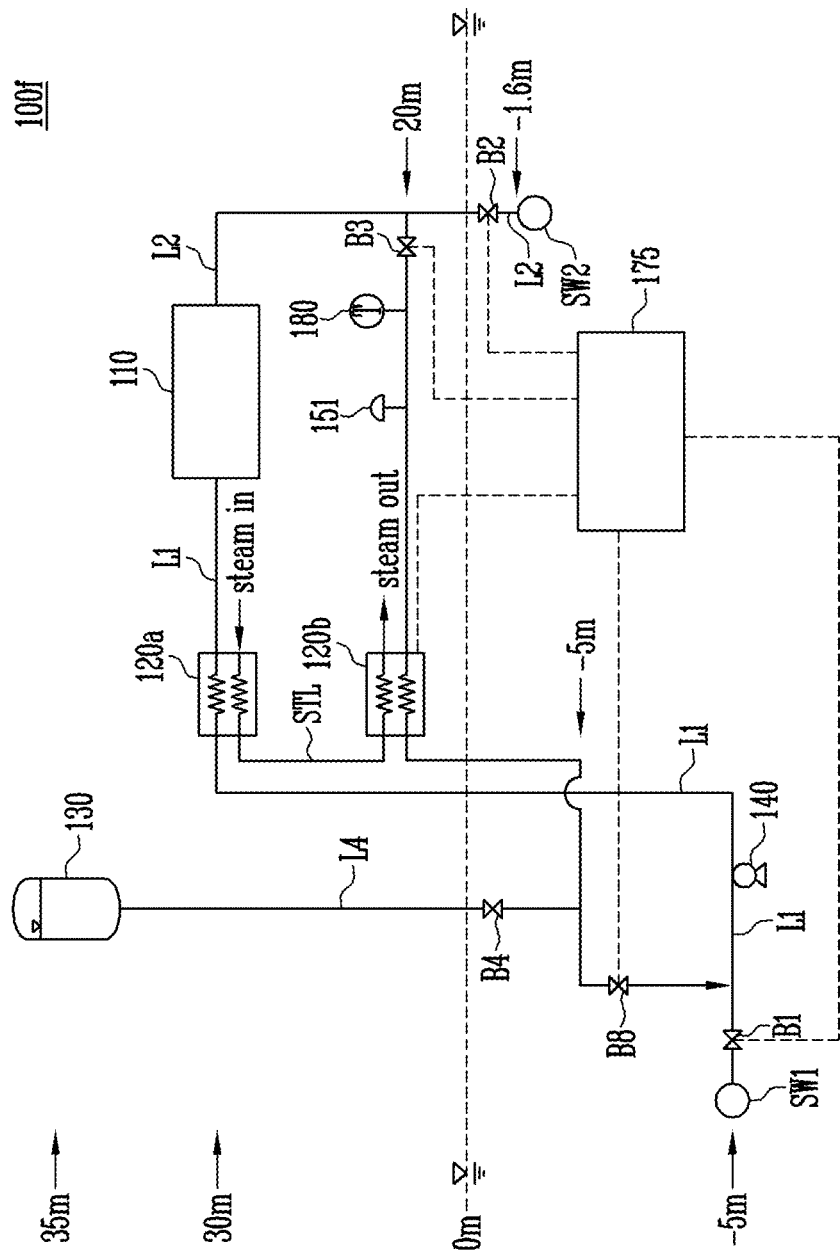
FIG. 7 is a conceptual diagram of a seawater supply apparatus according to a sixth exemplary embodiment of the present invention.

FIG. 7 is a conceptual diagram of a seawater supply apparatus according to a sixth exemplary embodiment of the present invention.

As illustrated in FIG. 7, a seawater supply apparatus 100f includes a heat source heat exchanger 100, a heater 120a, a second heater 120b, a pressure maintaining device 130, a seawater pump 140, and a sixth control unit 175.

Herein, the heat source heat exchanger 110, the pressure maintaining device 130, and the seawater pump 140 are the same as those described in the seawater supply apparatuses 100a to 100e according to the first to fifth exemplary embodiments of the present invention, thereby being replaced with those of the seawater supply apparatuses 100a to 100e according to the first to fifth exemplary embodiments of the present invention.

The first heater 120a may be arranged between the heat source heat exchanger 110 and the seawater pump 140 on a seawater supply line L1, and may be disposed at a position, which is above the sea surface, about 30 m above the sea surface.

The first heater 120a receives the seawater through the seawater supply line L1, heats the seawater, and supplies the heated seawater to the heat source heat exchanger 110, and may be operated when the sea water supply apparatus 100f is driven in the close loop operation type. That is, when a temperature of the seawater is extremely low and the heat source heat exchanger 110 cannot transfer a heat source to the intermediate heat medium as many as the amount needed, the first heater 120a may heat the seawater.

In this case, the first heater 120a may receive a heat source, such as steam, from a boiler (of which a reference numeral is not indicated) through a steam line STL and heat the seawater, but the first heater 120a is not limited thereto, and may be an electric heater. Herein, the first heater 120a may be serially connected with the second heater 120b, which is to be described below, through the steam line STL, and may be driven with one heat source, that is, one steam heat source.

The second heater 120b may be disposed on a circulation connection line L3 and be disposed at a position about 20 m above the heat surface, and may heat the seawater flowing in the circulation connection line L3.

The second heater 120b receives the seawater through the seawater discharge line L2, heats the seawater, and supplies the heated seawater to the heat source heat exchanger 110, and may be operated when the sea water supply apparatus 100f is driven in the close loop operation type. That is, when a temperature of the seawater is extremely low, so that the heat source heat exchanger 110 cannot transfer a heat source to the intermediate heat medium as many as the amount needed, the first heater 120a may heat the seawater.

In this case, the second heater 120b may be serially connected with the first heater 120a through the steam linen STL, and receive a heat source, such as steam and heat the seawater, but the second heater 120b is not limited thereto, and may be an electric heater.

That is, the second heater 120b may share the heat source with the first heater 120a, and the second heater 120b may finally extract and use the heat source of the steam, which is left after the first heater 120a heats the seawater, so that there is an effect in that energy efficiency is maximized.

The sixth control unit 175 may control the energy to be optimized and used when the operation type of the sea water supply apparatus 100e is switched so that the seawater flows from the seawater discharge line L2 to the circulation connection line L3, that is, the operation type of the sea water supply apparatus 100f is switched from the open loop operation type to the close loop operation type, by adjusting the opening of the seawater supply valve B1, the seawater discharge valve B2, the circulation valve B3, and the non-stop switch valve B8 and controlling the operation of the second heater 120b.

Herein, the sixth control unit 175 may be connected with the seawater supply valve B1, the seawater discharge valve B2, the circulation valve B3, the non-stop switch valve B8, and the second heater 120b wiredly or wirelessly and adjust the opening of each of the valves B1 to B3, and B8 and control the operation of the second heater 120b.

When the operation type of the sea water supply apparatus 100f is switched so that the seawater flows from the seawater discharge line L2 to the circulation connection line L3, that is, the operation type of the sea water supply apparatus 100f is switched from the open loop operation type to the close loop operation type, the sixth control unit 175 may control at least a part of the seawater discharged to the seawater discharge line L2 to be supplied to the circulation connection line L3 by opening the circulation valve B3.

Particularly, when the operation type of the sea water supply apparatus 100f is switched from the open loop operation type to the close loop operation type, the sixth control unit 175 may control the seawater supply valve B1 and the sweater discharge valve B2 to maintain the open state, control the non-stop switch valve B8 to maintain the close state, and control the state of the circulation valve B3 to be switched from the close state to the open state.

In this case, the seawater is supplied from the seawater inlet SW1, passes through the seawater supply line L1, and is discharged to the seawater outlet SW2 through the seawater discharge line L2, and simultaneously at least a part of the seawater passing through the seawater discharge line L2 flows into the circulation connection line L3, so that the circulation connection line L3 may be filled with the seawater, and the packing fluid remaining in the circulation connection line L3 may be removed through an air removal valve 51.

The sixth control unit 175 may control the circulation valve B3 to maintain the open state, and control the seawater supply valve B1 and the seawater discharge valve B2 to be closed and the non-stop switch valve B8 to be opened at the moment, at which the circulation connection line L3 is fully filled with the seawater, and a temperature of the seawater is measured by a seawater temperature measuring sensor 180, and when the temperature of the seawater is lower than a predetermined temperature, the sixth control unit 175 may control the second heater 120b to be operated.

Herein, the seawater temperature measuring sensor 180 may be provided on the circulation connection line L3, and may be connected with the sixth control unit 175 wiredly or wirelessly and transfer temperature information about the seawater to the sixth control unit 175.

In this case, the seawater passes through the seawater supply line L1 and flows into the circulation connection line L3 through the seawater discharge line L2, and the seawater flowing into the circulation connection line L3 is supplied to the seawater supply line L1 again, so that the seawater circulates in the close loop. That is, the seawater may continuously circulate the seawater supply line L1, the seawater discharge line L2, the circulation connection line L3, and the seawater supply line L1, and may continuously supply an appropriate temperature to the heat source heat exchanger 110.

Accordingly, in the exemplary embodiment of the present invention, it is possible to continuously supply the heat source to the heat source heat exchanger 110 regardless of a change in a temperature of the seawater, and the second heater 120b heats the seawater while sharing the heat source of the first heater 120a, in addition to the first heater 120a, so that there is an effect in that energy is economically consumed.

A demander 60 may receive the liquefied gas vaporized by the vaporizer 50 and consume the received liquefied gas. Herein, the demander 60 may receive the liquefied gas in a gas phase obtained by vaporizing the liquefied gas and use the liquefied gas, and may be a land terminal installed on land or an ocean terminal floated and installed on the sea.

As described above, the ship including the gas re-vaporizing system according to the present invention has an effect in that it is possible to maximize efficiency of the re-vaporization of the liquefied gas.

Figure 8:
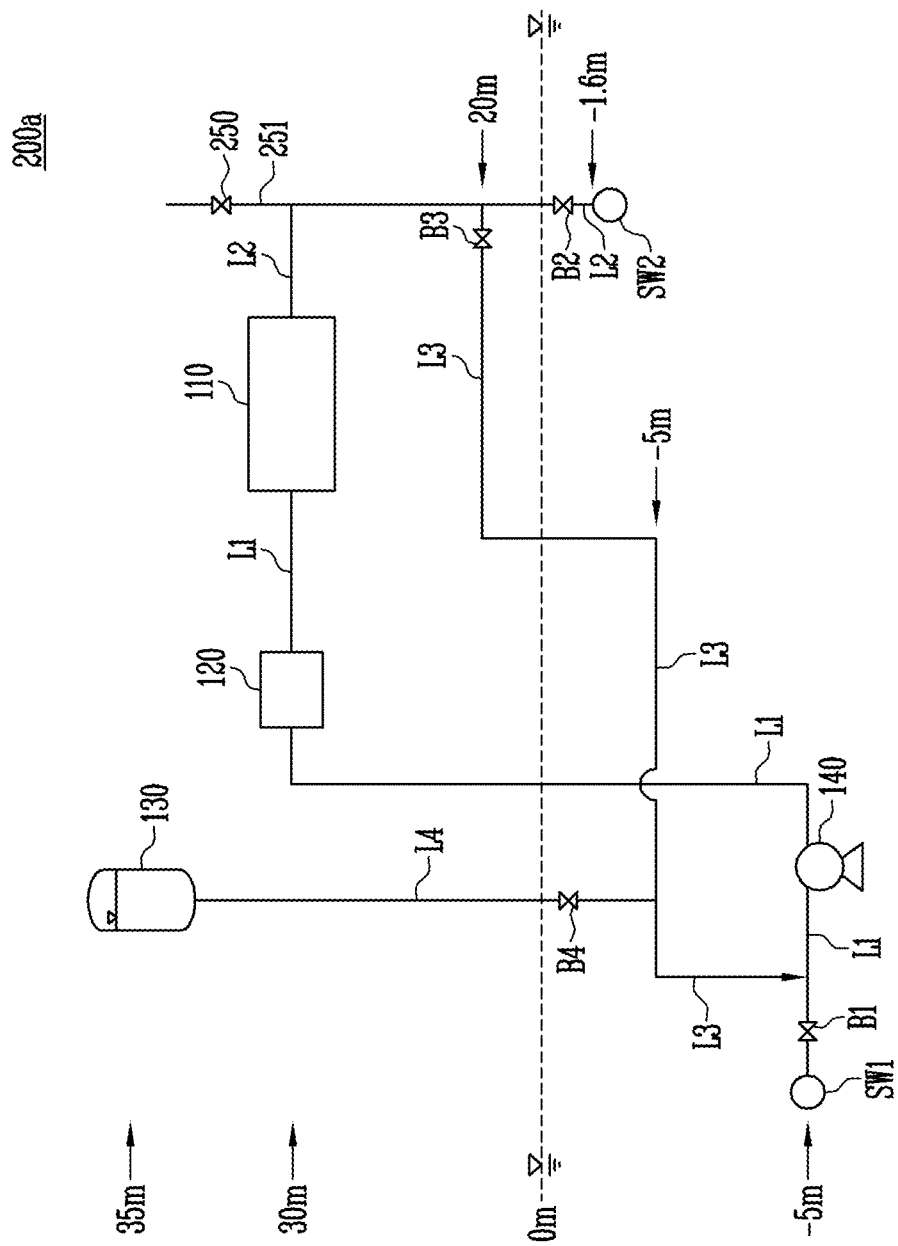
FIG. 8 is a conceptual diagram of a seawater supply apparatus according to an exemplary embodiment of the related art.

FIG. 8 is a conceptual diagram of a seawater supply apparatus according to the related art.

As illustrated in FIG. 8, a seawater supply apparatus 200a in the related art supplies seawater, which is a heat source for re-vaporizing liquefied gas by a re-vaporizing apparatus (a heat source heat exchanger 110), to the re-vaporizing apparatus, and may have an open loop operation type and a close loop operation type as an operation type.

Herein, the open loop operation type refers to the case where seawater is supplied and discharged in only one direction from a seawater supply line L1 to a seawater discharge line L2, and the close loop operation type refers to the case where seawater passes through the seawater supply line L1, the seawater discharge line L2, and a circulation connection line L3 and circulates the seawater supply line L1, the seawater discharge line L2, and the circulation connection line L3 again. As described above, the bi-directional switch of the operation type of the seawater supply apparatus 200a in the related art from the open loop operation type to the close loop operation type results from a change in a temperature of seawater.

When the seawater supply apparatus 200a in the related art is driven in the open loop operation type, the seawater is supplied and discharged in only one direction from the seawater supply line L1 to the seawater discharge line L2.

In this case, when pressure of the seawater discharged from the seawater discharge line L2 is low, a negative pressure is generated in the seawater discharge line L2, so that there is a concern that performance of the heat source heat exchanger 110 is degraded and air flows into the seawater discharge line L2, thereby causing a problem in that internal coating is damaged or corroded.

Accordingly, the seawater supply apparatus 200a in the related art is provided with a vacuum removal valve 250 and a vacuum removal line 251 and dispose the vacuum removal line 251 at a rear end of the heat source heat exchanger 110 on the seawater discharge line L2 to additionally supply pressure with air supplied through the vacuum removal line 251, thereby preventing the pressure of the seawater discharged from the seawater discharge line L2 from being decreased.

However, in the seawater supply apparatus 200a in the related art, the negative pressure generated in the seawater discharge line L2 is directly generated at the rear end of the heat source heat exchanger 110. Accordingly, the negative pressure immediately causes a problem to the heat source heat exchanger 110, and there is a problem in that the negative pressure is not sufficiently compensated only with the vacuum removal valve 250 and the vacuum removal line 251.

In order to solve the foregoing problem, the present applicant developed a seawater supply apparatus 200b of the present invention, which will be described below in detail with reference to FIGS. 9 and 12.

Non-described reference numerals 120, 130, 140, L4, SW1, and SW2 in FIG. 8 refer to a heater 120, a pressure maintaining device 130, a seawater pump 140, a pressure maintaining device connection line L4, a seawater inlet SW1, and a seawater outlet SW2, respectively, and are the same as those described in the seawater supply apparatuses 100a to 100f according to the first to sixth exemplary embodiments of the present invention, thereby being replaced with those described in the seawater supply apparatuses 100a to 100f according to the first to sixth exemplary embodiments of the present invention.

Figure 9:
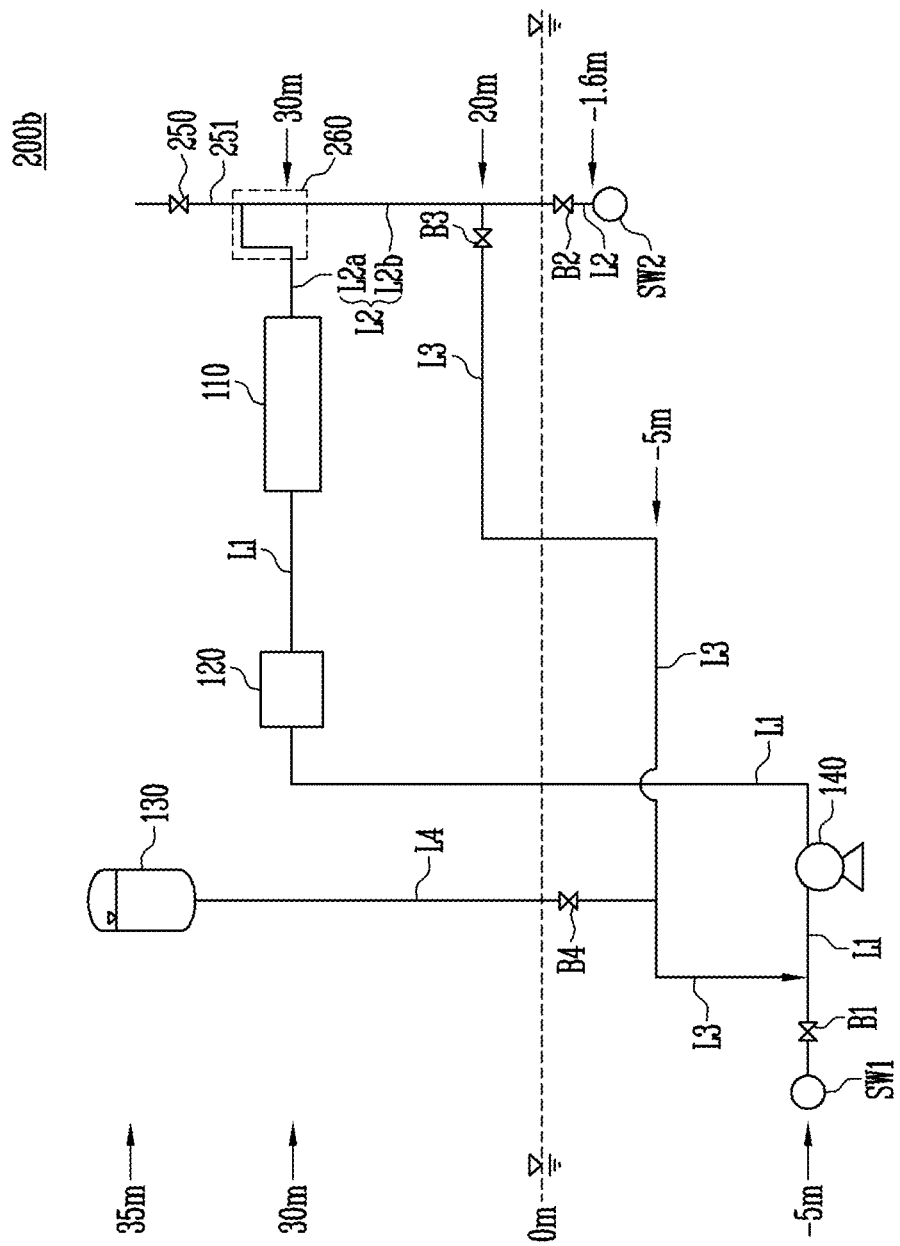
FIG. 9 is a conceptual diagram of a seawater supply apparatus according to a seventh exemplary embodiment of the present invention.

FIG. 9 is a conceptual diagram of a seawater supply apparatus according to a seventh exemplary embodiment of the present invention.

As illustrated in FIG. 9, the seawater supply apparatus 200b according to the seventh exemplary embodiment in the gas re-vaporizing system 1 of the present invention includes a heat source heat exchanger 110, a heater 120, a pressure maintaining device 130, a seawater pump 140, a vacuum removal valve 250, a vacuum removal line 251, and a negative pressure preventing line 260.

Before describing an individual configuration of the seawater supply apparatus 200*b* of the seventh exemplary embodiment of the present invention, basic flow paths organically connecting the individual configurations will be described. Herein, a flow path is a passage, through which a fluid flows, and may mean a line, but is not limited thereto, and any configuration, in which a fluid flows, is acceptable.

Further, the present invention includes all of the exemplary embodiments generated by a combination of the first to sixth exemplary embodiments of the present invention with the publicly known technology or a combination of at least two exemplary embodiments. For example, the seawater supply apparatus 200*b* according to the seventh exemplary embodiment of the present invention may be combined with the seawater supply apparatuses 100*a* to 100*f* according to at least one of the first to sixth exemplary embodiments of the present invention, and particularly, the configurations of the vacuum removal valve 250, the vacuum removal line 251, and the negative pressure preventing line 260 in the seawater supply apparatus 200*b* according to the seventh exemplary embodiment may be applied to the seawater supply apparatuses 100*a* to 100*f* according to at least one of the first to sixth exemplary embodiments of the present invention.

In the exemplary embodiment of the present invention, the seawater supply apparatus 200*b* may further include a seawater supply line L1, a seawater discharge line L2, a circulation connection line L3, and a pressure maintaining device connection line L4. A valve (not illustrated), of which an opening level is adjustable, may be installed in each line, and the amount of seawater or fluid supplied may be controlled according to the adjustment of the opening level of each valve.

The seawater supply line L1 may connect a seawater inlet SW1 and the heat source heat exchanger 110, and may supply seawater supplied from the seawater inlet SW1 to the heat source heat exchanger 110 through the seawater pump 140.

The seawater supply line L1 may be provided with the seawater pump 140, a seawater supply valve B1, and the heater 120, and at least a part of the seawater supply line L1 may be disposed below a sea surface. Herein, the seawater inlet SW1 may be located about 5 m below a sea surface, and the seawater supply valve B1 may be provided in an upstream of the seawater pump 140 on the seawater supply line L1.

The seawater discharge line L2 may connect the heat source heat exchanger 110 and the seawater outlet SW2, may include the negative pressure preventing line 260, and may discharge the seawater discharged from the heat source heat exchanger 110 to the seawater outlet SW2.

The seawater discharge line L2 may be divided into a seawater discharge upstream line L2*a*, which connects the heat source heat exchanger 110 and the negative pressure preventing line 260 and a seawater discharge downstream line L2*b*, which connects the negative pressure preventing line 260 and the seawater outlet SW2.

The seawater discharge line L2 may be provided with a seawater discharge valve B2, and at least a part of the seawater discharge line L2 may be disposed below the sea surface. Herein, the seawater outlet SW2 may be located about 2 m (preferably, about 1.6 m below) below the sea surface, and the seawater discharge valve B2 may be provided in a downstream of a branch point of a circulation connection line L3 on the seawater discharge line L2.

The circulation connection line L3 is branched from the seawater discharge line L2 and connects the seawater supply line L1, and re-supplies the seawater discharged from the seawater discharge line L2 to the seawater supply line so that the seawater flows when the seawater supply apparatus 200*b* is driven in the close loop operation type, thereby circulating the seawater.

Particularly, the circulation connection line L3 may be branched from the seawater discharge downstream line L2*b* on the seawater discharge line L2 and be connected between the seawater supply valve B1 and the seawater pump 140 on the seawater supply line L1, and may be provided with a circulation valve B3. Herein, the point, at which the circulation connection line L3 is branched from the seawater discharge downstream line L2*b*, may be located at a position about 20 m above the sea surface.

The pressure maintaining device connection line L4 may connect the pressure maintaining device 130 and the circulation connection line L3, and may supply the seawater stored inside the pressure maintaining device 130 to the circulation connection line L3 when the seawater supply apparatus 200*b* is driven in the close loop operation type. Herein, the pressure maintaining device connection line L4 may be provided with a pressure maintaining device supply valve B4.

Hereinafter, the individual configurations organically formed by the lines L1 to L4 and implementing the seawater supply apparatus 200*b* will be described.

The heat source heat exchanger 110 may be connected with the seawater supply line L1 and the seawater discharge line L2, and may be disposed at a position about 28 m to 32 m (preferably, about 30 m) above the sea surface.

The heat source heat exchanger 110 may receive the seawater through the seawater supply line L1 and transfer a heat source to an intermediate heat medium, and may discharge the seawater, which is heat exchanged with the intermediate heat medium, through the seawater discharge line L2.

Herein, the heat source heat exchanger 110 may be a shell & tube type or a Printed Circuit Heat Exchanger (PCHE).

The heater 120 may be provided between the heat source heat exchanger 110 and the seawater pump 140 on the seawater supply line L1, and may be disposed at a position above the sea surface, that is, a position about 30 m above the sea surface.

The heater 120 may receive the seawater through the seawater supply line L1, heat the received seawater, and supply the heated seawater to the heat source heat exchanger 110, and may be operated when the seawater supply apparatus 200*b* is driven in the close loop operation type. That is, when a temperature of the seawater is extremely low and the heat source heat exchanger 110 cannot transfer a heat source to the intermediate heat medium as many as the amount needed, the heater 120 may heat the seawater.

In this case, the 120 may receive a heat source, such as steam, from a boiler (not illustrated) and heat the seawater, but the 120 is not limited thereto, and may be an electric heater.

The pressure maintaining device 130 may be provided on the circulation connection line L3, and maintain pressure of the seawater flowing in the circulation connection line L3.

Particularly, the pressure maintaining device 130 may be connected with the circulation connection line L3, and may open the pressure maintaining device supply valve B4 when the seawater supply apparatus 200*b* is driven in the close loop operation type and maintain the pressure of the seawater flowing in the circulation connection line L3 by suing the fluid stored therein.

In this case the pressure maintaining device 130 may be located about 35 m above the sea surface, and may be formed of a container, of which an upper side is opened so as to communicate with the air, thereby maintaining a pressure of the seawater by using atmospheric pressure.

That is, in the exemplary embodiment of the present invention, the pressure maintaining device 130, which is located about 35 m above the sea surface, is connected with the circulation connection line L3 located about 5 m below the sea surface, so that the pressure maintaining device 130 may compensate for the pressure of the seawater flowing into the seawater pump 140 by using a water head (about 40 m, 4 bars) of the seawater, thereby constantly maintaining the pressure of the seawater circulating the circulation connection line L3, the seawater supply line L1, and the seawater discharge line L2.

The seawater pump 140 may be provided on the seawater supply line L1 to supply the seawater to the re-vaporizing apparatus, that is, the heat source heat exchanger 110.

Particularly, the seawater pump 140 may be provided between the seawater supply valve B1 and the heater 120 on the seawater supply line L1 to pressurize the seawater supplied from the seawater inlet SW1 and supply the pressurized seawater to the heat source heat exchanger 110 via the heater 120.

The seawater pump 140 may be disposed at a position below the sea surface inside a ship body H, and the heat source heat exchanger 110 and the heater 120 may be disposed at a position below the sea surface inside the ship body H. For example, the seawater pump 140 may be disposed at a position about 5 m below the sea surface inside the ship body H, and the heat source heat exchanger 110 and the heater 120 may be disposed at a position 30 m above the sea surface inside the ship body H.

Accordingly, in order to supply the seawater to the heat source heat exchanger 110 and the heater 120 from the seawater pump 140, the seawater pump 140 may pressurize the seawater to a pressure level, in which it is possible to overcome a water head (about 35 m) of the seawater, and for example, the seawater pump 140 may pressurize with a pressure of about 3.5 bars or more.

The vacuum removal valve 250 may be provided on the vacuum removal line 251, and adjust a flow amount of air flowing into the seawater discharge line L2.

The vacuum removal valve 250 may control the air supplied from the outside to be supplied to the seawater discharge line L2 and control internal pressure of the seawater discharge line L2. Herein, the vacuum removal valve 250 may be provided with a separate control unit (not illustrated) and a pressure sensor (not illustrated) and may be controlled by the pressure sensor and the control unit.

The vacuum removal line 251 may be connected to the negative pressure preventing line 260, and may supply the air supplied from the outside to the seawater discharge line L2 and remove the negative pressure inside the seawater discharge line L2.

The vacuum removal line 251 may be connected with the seawater discharge downstream line L2b when is connected to the negative pressure preventing line 260. Further, the vacuum removal line 251 may be directly connected with the seawater discharge downstream line L2b, not the negative pressure preventing line 260, and even in this case, the vacuum removal line 251 may be connected with the seawater discharge downstream line L2b in parallel.

The negative pressure preventing line 260 may be provided on the seawater discharge line L2 and be formed at a position higher than the heat source heat exchanger 110.

Particularly, the negative pressure preventing line 260 may be connected with each of the seawater discharge upstream line L2a and the seawater discharge downstream line L2b of the seawater discharge line L2 to allow the seawater discharged from the heat source heat exchanger 110 to be supplied to the seawater discharge downstream line L2b via the seawater discharge upstream line L2a, and may be formed at a position higher than the heat source heat exchanger 110 on the seawater discharge line L2. Herein, the negative pressure preventing line 260 may have the form of a gooseneck.

Accordingly, the negative pressure, which is formed at the immediately rear end of the heat source heat exchanger 110, is generated within the negative pressure preventing line 260, and thus, there is an effect in that it is possible to sufficiently secure a time for removing, by the vacuum removal valve 250 and the vacuum removal line 251, the negative pressure.

That is, the negative pressure is located within the negative pressure preventing line 260, not the rear end of the heat source heat exchanger 110, while the vacuum removal valve 250 and the vacuum removal line 251 prepare the removal of the negative pressure, and thus, a back flow of the seawater to the heat source heat exchanger 110 or a seawater congestion phenomenon within the heat source heat exchanger 110 is not generated, so that there is an effect in that driving reliability of the re-vaporizing apparatus is improved and re-vaporization efficiency is maximized.

The negative pressure preventing line 260 may be connected with the seawater discharge upstream line L2a in a streamlined form, and may be connected with the seawater discharge downstream line L2b in parallel. Accordingly, the negative pressure preventing line 260 may be prevented from being damaged due to the seawater discharged from the heat source heat exchanger 110, so that there is an effect in that durability is improved.

A particular configuration of the negative pressure preventing line 260 will be described below in detail with reference to FIGS. 10 and 11.

Figure 10:
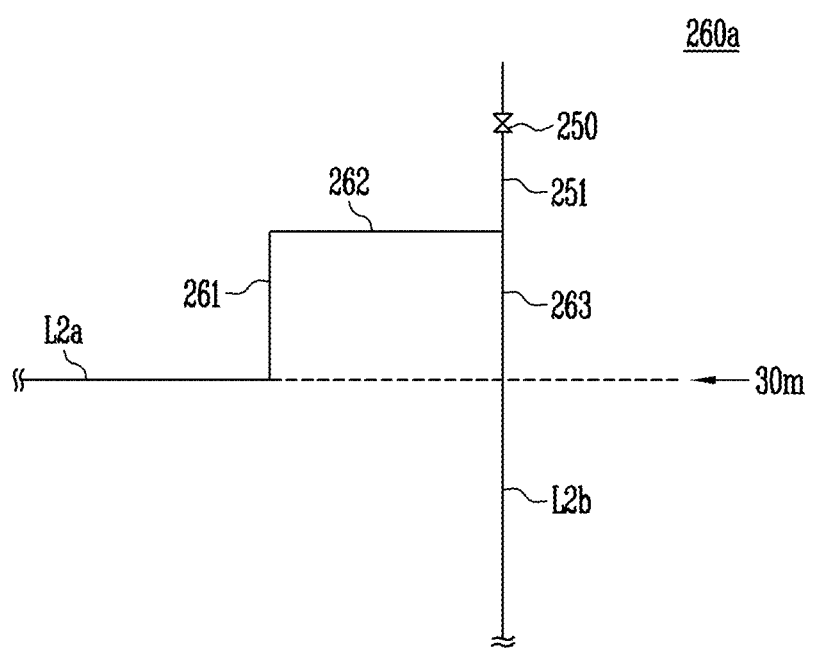
FIG. 10 is a first conceptual diagram of a negative pressure preventing unit provided to the seawater supply apparatus according to the seventh exemplary embodiment of the present invention.
Figure 11:
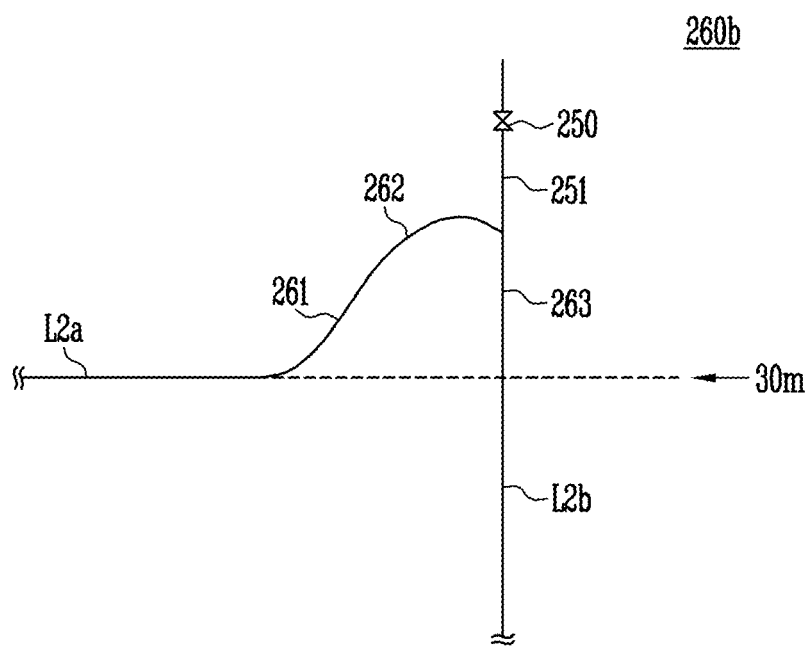
FIG. 11 is a second conceptual diagram of a negative pressure preventing unit provided to the seawater supply apparatus according to the seventh exemplary embodiment of the present invention.

FIG. 10 is a first conceptual diagram of a negative pressure preventing unit provided to the seawater supply apparatus according to the seventh exemplary embodiment of the present invention, and FIG. 11 is a second conceptual diagram of a negative pressure preventing unit provided to the seawater supply apparatus according to the seventh exemplary embodiment of the present invention.

As illustrated in FIGS. 10 and 11, the negative pressure preventing line 260 may be formed of an inlet 261, a connection part 262, and an outlet 263.

The inlet 261 may be connected with the seawater discharge upstream line L2a, and may receive the seawater discharged from the heat source heat exchanger 110 and transfer the received seawater to the connection part 262.

The inlet 261 may be connected with the seawater discharge upstream line L2a and the connection part 262 at a right angel (see FIG. 4), or may be connected with the seawater discharge upstream line L2a and the connection part 262 in the form of a streamline (see FIG. 5). Herein, the seawater discharge upstream line L2a may be formed to be horizontal to the heat source heat exchanger 110 at least.

The connection part 262 may connect the inlet 261 and the outlet 263, and supply the seawater flowing from the inlet 261 to the outlet 263.

The connection part 262 may be connected with the inlet 261 and the outlet 263 at a right angle (see FIG. 10), or may be connected with the inlet 261 and the outlet 263 in the form of a stream line (see FIG. 1). Herein, a portion, in which the connection art 262 is connected with the outlet 263, may be connected with the vacuum removal line 251.

The discharge part 263 may be connected with the seawater discharge downstream line L2b and the vacuum removal line 251, and may receive the seawater discharged from the connection part 262 and transfer the received seawater to the seawater discharge downstream line L2b. Herein, the discharge part 263 may be connected with the vacuum removal line 251 in parallel.

The outlet 263 may be connected with the seawater discharge downstream line L2b in parallel and may be connected with the connection part 262 at a right angle (see FIG. 10), or may be connected with the connection part 262 in the form of a streamline (see FIG. 11).

As described above, the inlet 261, the connection part 262, and the outlet 263 configuring the negative pressure preventing line 260 are formed at the positions higher than the heat source heat exchanger 110 on the seawater discharge line L2, so that the negative pressure, which is formed at the immediately rear end of the heat source heat exchanger 110, is generated within the negative pressure preventing line 260, and thus, there is an effect in that it is possible to sufficiently secure a time for removing, by the vacuum removal valve 250 and the vacuum removal line 251, the negative pressure.

As described above, the seawater supply apparatus 200b according to the exemplary embodiment of the present invention may shift the position in the seawater discharge line L2, in which the negative pressure is generated by an external environment, through the negative pressure preventing line 260 to a place, other than the immediately rear end of the heat source heat exchanger 110, so that there is an effect in that driving reliability of the re-vaporizing apparatus is improved and re-vaporization efficiency is maximized.

Figure 12:
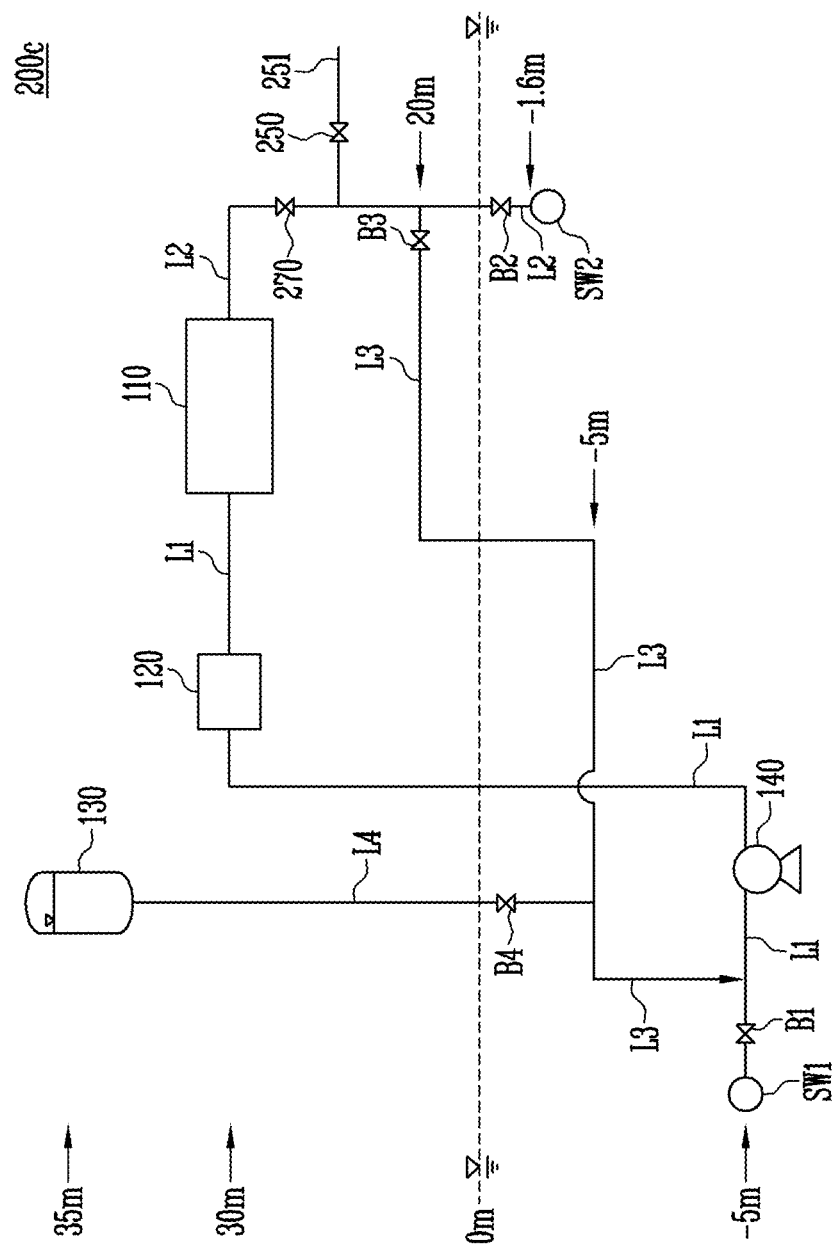
FIG. 12 is a conceptual diagram of a seawater supply apparatus according to an eighth exemplary embodiment of the present invention.

FIG. 12 is a conceptual diagram of a seawater supply apparatus according to an eighth exemplary embodiment of the present invention.

As illustrated in FIG. 12, a seawater supply apparatus 200c according to the eighth exemplary embodiment in the gas re-vaporizing system 1 of the present invention includes a heat source heat exchanger 110, a heater 120, a pressure maintaining device 130, a seawater pump 140, a vacuum removal valve 250, a vacuum removal line 251, and a negative pressure preventing line 270.

The heat source heat exchanger 110, the heater 120, the pressure maintaining device 130, and the seawater pump 140 of the seawater supply apparatus 200c according to the eighth exemplary embodiment in the gas re-vaporizing system 1 of the present invention use the same reference numerals as those of the heat source heat exchanger 110, the heater 120, the pressure maintaining device 130, and the seawater pump 140 of the seawater supply apparatus 200b according to the seventh exemplary embodiment illustrated in FIG. 9, but do not essentially indicate the same configurations.

Further, the present invention includes all of the exemplary embodiments generated by a combination of the first to sixth exemplary embodiments with the publicly known technology or a combination of at least two exemplary embodiments. For example, the seawater supply apparatus 200c according to the eighth exemplary embodiment of the present invention may be combined with the seawater supply apparatuses 100a to 100f according to at least one of the first to sixth exemplary embodiments of the present invention, and particularly, the configuration of the negative pressure preventing valve 270 in the seawater supply apparatus 200c according to the eighth exemplary embodiment may be applied to the seawater supply apparatuses 100a to 100f according to at least one of the first to sixth exemplary embodiments of the present invention.

Further, the seawater supply apparatus 200c according to the eighth exemplary embodiment of the present invention in the gas re-vaporizing system 1 of the present invention is different from the seawater supply apparatus 200b according to the seventh exemplary embodiment illustrated in FIG. 9 in that the negative pressure preventing line 260 is excluded, the negative pressure preventing valve 270 is added, and the position of the vacuum removal line 251 is changed.

Accordingly, hereinafter, only the configurations of the vacuum removal line 251 and the negative pressure preventing valve 270 will be described in detail.

The vacuum removal line 251 may be connected to the seawater discharge line L2, and may supply air supplied from the outside to the seawater discharge line L2 and remove the negative pressure inside the seawater discharge line L2.

Particularly, the vacuum removal line 251 may be connected to the downstream of the position, at which the negative pressure preventing valve 270 is provided on the seawater discharge line L2, based on the flow of the seawater. Accordingly, when the negative pressure within the seawater discharge line L2 is removed through the vacuum removal valve 250 and the vacuum removal line 251, the seawater supply apparatus 200c according to the eighth exemplary embodiment of the present invention may prevent the pressure from being excessively increased by the negative pressure preventing valve 270.

The vacuum removal line 251 may be vertically connected with the seawater discharge downstream line L2b when is connected to the seawater discharge line L2, and may be provided with the vacuum removal valve 250 on the vacuum removal line 251.

The negative pressure preventing valve 270 may be provided on the seawater discharge line L2, and may control a flow amount of seawater discharged from the heat source heat exchanger 110.

Particularly, the negative pressure preventing valve 270 may be provided between the seawater discharge valve B2 and the heat source heat exchanger 110 on the seawater discharge line L2, and may control a flow amount of the seawater discharged from the heat source heat exchanger 110 to enable positive pressure to be maintained in a section between the heat source heat exchanger 110 and the negative pressure preventing valve 270.

Herein, the negative pressure preventing valve 270 may be a throttling valve or an orifice.

As described above, in the exemplary embodiment of the present invention, the negative pressure preventing valve 270 is provided on the seawater discharge downstream line L2b, so that the negative pressure, which is formed at the immediately rear end of the heat source heat exchanger 110, is generated between the negative pressure preventing valve 270 and the seawater outlet SW2, and thus, there is an effect in that it is possible to sufficiently secure a time for removing, by the vacuum removal valve 250 and the vacuum removal line 251, the negative pressure.

As described above, the seawater supply apparatus 200c according to the eighth exemplary embodiment of the present invention may shift the position in the seawater discharge line L2, in which the negative pressure is generated by an external environment, through the negative pressure preventing valve 270 to a place, other than the immediately rear end of the heat source heat exchanger 110, so that there is an effect in that driving reliability of the re-vaporizing apparatus is improved and re-vaporization efficiency is maximized.

In the foregoing, the present invention has been described in detail through the particular exemplary embodiments, but the particular exemplary embodiments are for the purpose of describing the present invention in detail, and the present invention is not limited thereto, and it is apparent that those skilled in the art may make a modification or an improvement thereof within the technical spirit of the present invention.

All of the simple modifications or changes of the present invention belong to the scope of the range of the present invention, and the specific scope of the present invention may be apparent by the accompanying claims.

The invention claimed is:

1. A ship including a gas re-vaporizing system including a re-vaporizing apparatus, which re-vaporizes liquefied gas through seawater supplied by a seawater supply apparatus, wherein
   the seawater supply apparatus includes:
   a seawater supply line which supplies the seawater to the re-vaporizing apparatus;
   a seawater discharge line which discharges the seawater from the re-vaporizing apparatus;
   a circulation connection line branched from the seawater discharge line and connected to the seawater supply line;
   a seawater storage tank connected to the circulation connection line through a tank connection line, and configured to maintain pressure of the seawater flowing in the circulation connection line; and
   the tank connection line which connects the seawater storage tank, located to be above a sea surface, and a part of the circulation connection line, located to be below the sea surface, so that the tank connection line supplies a fluid inside the seawater storage tank to the circulation connection line.

2. The ship of claim 1, further comprising:
   a first opening/closing valve which is disposed closer to a point of the circulation connection line connected with the seawater supply line than a point of the circulation connection line connected with the seawater discharge line; and
   a second opening/closing valve which is disposed closer to the point of the circulation connection line branched from the seawater discharge line than the point of the circulation connection line connected with the seawater supply line.

3. The ship of claim 2, further comprising:
   a seawater pump which is provided on the seawater supply line and supplies the seawater to the re-vaporizing apparatus,
   wherein the seawater pump is located below the sea surface.

4. The ship of claim 3, further comprising:
   a third opening/closing valve which is provided in an upstream of the seawater pump on the seawater supply line;
   a fourth opening/closing valve which is provided in a downstream of a branch point of the circulation connection line in the seawater discharge line;
   a pressure maintaining fluid supply valve which is provided on the tank connection line; and
   a control unit which adjusts opening of the first to fourth opening/closing valves and the pressure maintaining fluid supply valve, and implements a switch so that the seawater flowing in the seawater discharge line flows the circulation connection line without being discharged to an outside of the seawater supply apparatus non-stop.

5. The ship of claim 4, wherein the control unit opens the pressure maintaining fluid supply valve and controls the fluid to be supplied to the circulation connection line before the operation type is switched so that the seawater flowing in the seawater discharge line flows the circulation connection line without being discharged to the outside.

6. The ship of claim 5, wherein when the circulation connection line is fully filled with the fluid, the control unit controls the third and fourth opening/closing valves to be closed and the first and second opening/closing valves to be opened.

7. A ship including a gas re-vaporizing system including a re-vaporizing apparatus, which re-vaporizes liquefied gas through seawater supplied by a seawater supply apparatus, wherein
   the seawater supply apparatus includes:
   a seawater supply line which supplies the seawater to the re-vaporizing apparatus;
   a seawater discharge line which discharges the seawater from the re-vaporizing apparatus;
   a circulation connection line branched from the seawater discharge line and connected to the seawater supply line;
   a seawater storage tank connected to the circulation connection line through a tank connection line, and configured to maintain pressure of the seawater flowing in the circulation connection line;
   the tank connection line which connects the seawater storage tank and the circulation connection line so that the tank connection line supplies a fluid inside the seawater storage tank to the circulation connection line; and
   a fire suppression firefighting water storage tank which stores firefighting water for suppressing fire,
   wherein the seawater storage tank is connected with the fire suppression firefighting water storage tank.

8. The ship of claim 7, wherein the fire suppression firefighting water storage tank supplies the firefighting water stored therein to the seawater storage tank.

9. The ship of claim 1, wherein at least a part of the seawater discharge line is formed at a position higher than the re-vaporizing apparatus.

10. A ship including a gas re-vaporizing system including a re-vaporizing apparatus, which re-vaporizes liquefied gas through seawater supplied by a seawater supply apparatus, wherein
    the seawater supply apparatus includes:
    a seawater supply line which supplies the seawater to the re-vaporizing apparatus;
    a seawater discharge line which discharges the seawater from the re-vaporizing apparatus;
    a circulation connection line branched from the seawater discharge line and connected to the seawater supply line;
    a seawater storage tank connected to the circulation connection line through a tank connection line, and configured to maintain pressure of the seawater flowing in the circulation connection line; and
    the tank connection line which connects the seawater storage tank and the circulation connection line so that the tank connection line supplies a fluid inside the seawater storage tank to the circulation connection line,
    wherein the seawater discharge line includes:

a negative pressure preventing line which is formed at a position higher than the re-vaporizing apparatus;

a seawater discharge upstream line which connects the re-vaporizing apparatus and the negative pressure preventing line; and a seawater discharge downstream line which is connected with the negative pressure preventing line and a seawater outlet, through which the seawater is discharged to an outside of the seawater supply apparatus.

11. The ship of claim 10, wherein at least a part of the seawater discharge upstream line is horizontal to the re-vaporizing apparatus.

12. The ship of claim 10, wherein the negative pressure preventing line is connected with the seawater discharge upstream line in the form of a streamline.

13. The ship of claim 10, wherein the seawater discharge downstream line vertically connects the negative pressure preventing line and the seawater outlet.

14. The ship of claim 10, wherein the seawater supply apparatus further includes:

a vacuum removal line which removes a negative pressure within the seawater discharge line; and a vacuum removal valve which is provided on the vacuum removal line and adjusts a flow amount of air flowing into the seawater discharge line, and the vacuum removal line is connected to the seawater discharge downstream line in parallel.

15. The ship of claim 14, wherein the negative pressure preventing line includes:

an inlet which is connected with the seawater discharge upstream line;

an outlet which is connected with the seawater discharge downstream line; and a connection part which connects the inlet and the outlet, and the outlet is connected with the vacuum removal line in parallel.

16. The ship of claim 15, wherein the connection part is connected with the inlet in the form of a streamline.

17. The ship of claim 15, wherein the connection part is connected with the inlet and the outlet at a right angle.

18. The ship of claim 9, wherein the seawater supply apparatus further includes:

a negative pressure preventing valve which is provided on the seawater discharge line and controls a flow amount of the seawater discharged from the re-vaporizing apparatus;

a vacuum removal line which removes a negative pressure within the seawater discharge line; and a vacuum removal valve, which is provided on the vacuum removal line and adjusts a flow amount of air flowing into the seawater discharge line, and the vacuum removal line is connected to a downstream of a position, at which the negative pressure preventing valve is provided, in the seawater discharge line based on a flow of the seawater.

19. The ship of claim 18, wherein the seawater supply apparatus further includes a seawater discharge valve which is provided between the negative pressure preventing valve and a seawater outlet, through which the seawater is discharged to the outside on the seawater discharge line, and controls the discharge of the seawater to the outside.

20. The ship of claim 9, wherein the re-vaporizing apparatus includes:

a vaporizer which vaporizes the liquefied gas by using an intermediate heat medium; and a heat source heat exchanger which supplies a heat source of the seawater to the intermediate heat medium, and at least a part of the seawater discharge line is formed at a position higher than the heat source heat exchanger.

* * * * *